US010965555B2

(12) United States Patent
Yousuf et al.

(10) Patent No.: US 10,965,555 B2
(45) Date of Patent: *Mar. 30, 2021

(54) ACCELERATED NETWORK TRAFFIC SAMPLING USING AN ACCELERATED LINE CARD

(71) Applicant: Arista Networks, Inc., Santa Clara, CA (US)

(72) Inventors: Muhammad Khalid Yousuf, Milpitas, CA (US); Kevin Martin Amiraux, San Jose, CA (US); Sambath Kumar Balasubramanian, Fremont, CA (US); Sonny N. Tran, Fremont, CA (US); Stefan J. Rebaud, Vancouver (CA); Min H. Teng, Los Altos, CA (US); François Labonté, Menlo Park, CA (US)

(73) Assignee: Arista Networks, Inc., Santa Clara, CA (US)

( * ) Notice: Subject to any disclaimer, the term of this patent is extended or adjusted under 35 U.S.C. 154(b) by 104 days.

This patent is subject to a terminal disclaimer.

(21) Appl. No.: 15/877,782

(22) Filed: Jan. 23, 2018

(65) Prior Publication Data

US 2019/0230009 A1    Jul. 25, 2019

(51) Int. Cl.
*H04L 12/26* (2006.01)
*H04L 29/06* (2006.01)
(Continued)

(52) U.S. Cl.
CPC ........ *H04L 43/024* (2013.01); *H04L 12/4641* (2013.01); *H04L 43/00* (2013.01); *H04L 45/00* (2013.01); *H04L 69/22* (2013.01)

(58) Field of Classification Search
CPC ... H04L 41/08; H04L 41/085; H04L 41/0813; H04L 41/0896; H04L 29/06; H04L 67/125; H04L 67/2838
(Continued)

(56) References Cited

U.S. PATENT DOCUMENTS 7,787,442 B2 * 8/2010 Akahane ............... H04L 43/00
                                                    370/352
9,401,853 B2 * 7/2016 Agarwal ............... H04L 43/04
(Continued)

FOREIGN PATENT DOCUMENTS

JP    2009-16987 A    1/2009

OTHER PUBLICATIONS

International Search Report issued in corresponding Application No. PCT/US2019/014632, dated Apr. 16, 2019.
(Continued)

*Primary Examiner* — Mahran Y Abu Roumi
(74) *Attorney, Agent, or Firm* — Chamberlain, Hrdlicka, White, Williams & Aughtry

(57) ABSTRACT

A method and system of accelerating monitoring of network traffic. The method may include receiving, at a network chip of a network device, a network traffic data unit; capturing, by the network chip, the network traffic data unit based on a traffic sampling rate; adding, by the network chip, a sampling header to the network traffic data unit to obtain a sampled network traffic data unit; sending the sampled network traffic data unit from the network chip to a sampling engine; receiving, from the sampling engine, a flow datagram that includes a network traffic data unit portion and a flow datagram header; generating a flow network data traffic unit that includes the flow datagram; and transmitting the flow network data traffic unit towards a collector.

20 Claims, 12 Drawing Sheets

(51) Int. Cl.
*H04L 12/46* (2006.01)
*H04L 12/701* (2013.01)

(58) Field of Classification Search
USPC .......................................................... 709/223
See application file for complete search history.

(56) References Cited

U.S. PATENT DOCUMENTS

| | | | | |
|---|---|---|---|---|
| 10,097,464 | B1* | 10/2018 | Conlon | H04L 47/125 |
| 2006/0072564 | A1 | 4/2006 | Cornett et al. | |
| 2007/0016666 | A1* | 1/2007 | Duffield | H04L 12/14 709/223 |
| 2009/0138645 | A1 | 5/2009 | Chun et al. | |
| 2013/0304915 | A1* | 11/2013 | Kawai | H04L 41/5019 709/224 |
| 2014/0035938 | A1 | 2/2014 | Wang et al. | |
| 2014/0198793 | A1* | 7/2014 | Allu | H04L 45/245 370/392 |
| 2014/0241144 | A1 | 8/2014 | Kashyap | |
| 2018/0309647 | A1* | 10/2018 | Rosenberg | H04L 43/022 |
| 2019/0058641 | A1 | 2/2019 | Mirzazad Barijough et al. | |
| 2019/0166020 | A1* | 5/2019 | Mommileti | H04L 43/022 |
| 2019/0190851 | A1* | 6/2019 | Hsu | H04L 49/25 |
| 2019/0230198 | A1 | 7/2019 | Kurakami et al. | |

OTHER PUBLICATIONS

Written Opinion issued in corresponding Application No. PCT/US2019/014632, dated Apr. 16, 2019.
Arista; "Arista 7500R series: Q&A", Oct. 31, 2017; XP055578026; https://www.enbitcon.de/shop/media/pdf/0c/bb/77/7500RSeries-QA.pdf (retreived May 15, 2019).
Peter Phaal et al.; "sFlow Version 5"; sFlow.org; Jul. 2004; XP055578036; https://sflow.org/sflow_version_5.txt (retreived May 15, 2019).
Rick Hofstede et al.; "Flow Monitoring Explained: From Packet Capture to Data Analysis With NetFlow and IPFIX"; IEEE Communication Surveys Tutorials; vol. 16, No. 4; pp. 2037-2064; 2014.
"SFlow: RESTflow"; Aug. 28, 2013; XP055578059; https://blog.sflow.com/2013/08/restflow.html (retreived May 15, 2019).

\* cited by examiner

ACCELERATED NETWORK TRAFFIC SAMPLING USING AN ACCELERATED LINE CARD

BACKGROUND

Networks of interconnected devices (e.g., computer networks) are often monitored to, for example, ascertain characteristics of network traffic flow of the network. Such monitoring may be implemented via sampling some portion of the network traffic (e.g., packets, frames, etc.) transmitted into, out of, or within the network to ascertain various items of information related to the network traffic. However, such processing may require that one or more processors of a network device in the network perform at least a portion of the activities required for sampling functionality. Such activities may place a workload burden on the processors, which may affect network device performance.

SUMMARY

In general, in one aspect, the invention relates to a method of accelerating monitoring of network traffic. In one or more embodiments of the invention, the method includes receiving, at a network chip of a network device, a network traffic data unit; capturing, by the network chip, the network traffic data unit based on a traffic sampling rate; adding, by the network chip, a sampling header to the network traffic data unit to obtain a sampled network traffic data unit; sending the sampled network traffic data unit from the network chip to a sampling engine; receiving, from the sampling engine, a flow datagram that includes a network traffic data unit portion and a flow datagram header; generating a flow network data traffic unit that includes the flow datagram; and transmitting the flow network data traffic unit towards a collector.

In general, in one aspect, the invention relates to a non-transitory computer readable medium including instructions that, when executed by a processor, configure a network device to perform a method of accelerating monitoring of network traffic. In one or more embodiments of the invention, the method includes receiving, at a network chip of a network device, a network traffic data unit; capturing, by the network chip, the network traffic data unit based on a traffic sampling rate; adding, by the network chip, a sampling header to the network traffic data unit to obtain a sampled network traffic data unit; sending the sampled network traffic data unit from the network chip to a sampling engine; receiving, from the sampling engine, a flow datagram that includes a network traffic data unit portion and a flow datagram header; generating a flow network data traffic unit that includes the flow datagram; and transmitting the flow network data traffic unit towards a collector.

In general, in one aspect, the invention relates to a method of accelerating monitoring of network traffic. In one or more embodiments of the invention, the method includes receiving, at a sampling engine and from a network chip, a sampled network traffic data unit comprising a sampling header and a network traffic data unit; processing the sampled network traffic data unit to obtain sample information; truncating the network traffic data unit to obtain a network traffic data unit portion; generating a flow sample header that includes the sample information; storing, in storage of the sampling engine, a flow sample that includes the flow sample header and the network traffic data unit portion; constructing a flow datagram that includes the flow sample and a plurality of other flow samples; sending the flow datagram to the network chip; and clearing the flow sample and the plurality of other flow samples from the storage of the sampling engine.

In general, in one aspect, the invention relates to a non-transitory computer readable medium including instructions that, when executed by a processor, configure a network device to perform a method of accelerating monitoring of network traffic. In one or more embodiments of the invention, the method includes receiving, at a sampling engine and from a network chip, a sampled network traffic data unit that includes a sampling header and a network traffic data unit; processing the sampled network traffic data unit to obtain sample information; truncating the network traffic data unit to obtain a network traffic data unit portion; generating a flow sample header that includes the sample information; storing, in storage of the sampling engine, a flow sample that includes the flow sample header and the network traffic data unit portion; constructing a flow datagram that includes the flow sample and a plurality of other flow samples; sending the flow datagram to the network chip; and clearing the flow sample and the plurality of other flow samples from the storage of the sampling engine.

In general, in one aspect, the invention relates to a system for accelerating monitoring of network traffic. In one or more embodiments of the invention, the system includes a network chip configured to receive a network traffic data unit; select the network traffic data unit based on a traffic sampling rate; add a sampling header to the network traffic data unit to obtain a sampled network traffic data unit; send the sampled network traffic data unit from the network chip to a sampling engine; receive, from the sampling engine, a flow datagram that includes a network traffic data unit portion; generate a flow network data traffic unit that includes the flow datagram; and send the flow network data traffic unit to a collector. In one or more embodiments of the invention, the system also includes the sampling engine operatively connected to the network chip, including storage, and configured to receive, at the sampling engine and from the network chip, a sampled network traffic data unit that includes the sampling header and the network traffic data unit; process the sampled network traffic data unit to obtain sample information and the network traffic data unit; truncate the network traffic data unit to obtain a network traffic data unit portion; generate a flow sample header comprising the sample information; store, in storage of the sampling engine, a flow sample that includes the flow sample header and the network traffic data unit portion; construct the flow datagram including the flow sample and a plurality of other flow samples; send the flow datagram to the network chip; and clear the flow sample and the plurality of other flow samples from the storage of the sampling engine.

Other aspects of the invention will be apparent from the following description and the appended claims.

DETAILED DESCRIPTION

Figure 1:
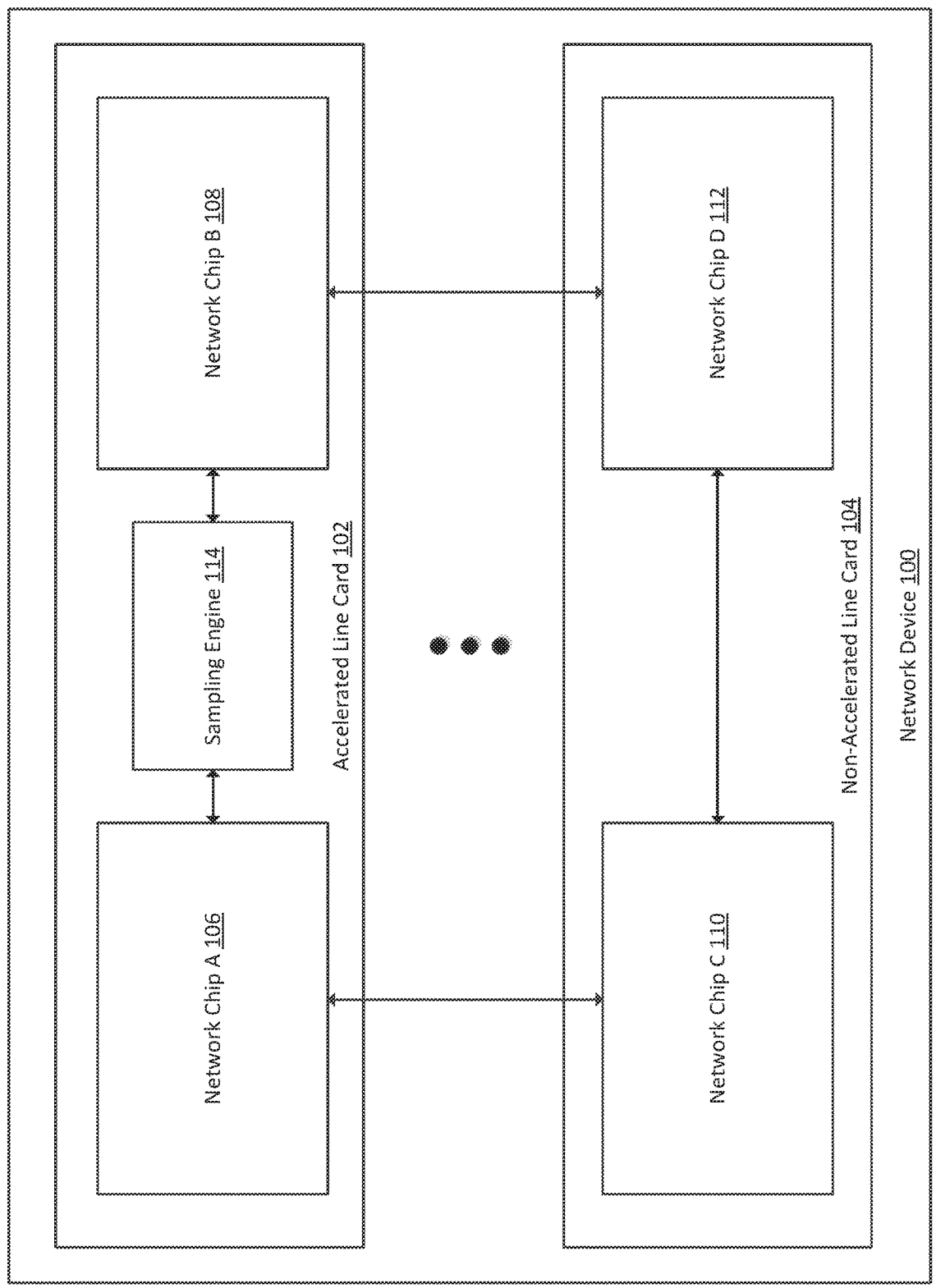
FIG. 1 shows a system in accordance with one or more embodiments of the invention.

Specific embodiments will now be described with reference to the accompanying figures. In the following description, numerous details are set forth as examples of the invention. It will be understood by those skilled in the art, and having the benefit of this Detailed Description, that one or more embodiments of the present invention may be practiced without these specific details and that numerous variations or modifications may be possible without departing from the scope of the invention. Certain details known to those of ordinary skill in the art may be omitted to avoid obscuring the description.

In the following description of the figures, any component described with regard to a figure, in various embodiments of the invention, may be equivalent to one or more like-named components described with regard to any other figure. For brevity, descriptions of these components will not be repeated with regard to each figure. Thus, each and every embodiment of the components of each figure is incorporated by reference and assumed to be optionally present within every other figure having one or more like-named components. Additionally, in accordance with various embodiments of the invention, any description of the components of a figure is to be interpreted as an optional embodiment, which may be implemented in addition to, in conjunction with, or in place of the embodiments described with regard to a corresponding like-named component in any other figure.

Throughout the application, ordinal numbers (e.g., first, second, third, etc.) may be used as an adjective for an element (i.e., any noun in the application). The use of ordinal numbers is not to imply or create any particular ordering of the elements nor to limit any element to being only a single element unless expressly disclosed, such as by the use of the terms "before", "after", "single", and other such terminology. Rather, the use of ordinal numbers is to distinguish between the elements. By way of an example, a first element is distinct from a second element, and the first element may encompass more than one element and succeed (or precede) the second element in an ordering of elements.

In general, embodiments of the invention relate to a system, method, and/or non-transitory computer readable medium for accelerating network traffic (i.e., flow) sampling. Specifically, in one or more embodiments of the invention, network traffic may be received by a network chip of a network device. A portion of the network traffic may be selected as sampled network traffic, mirrored (e.g., copied), and sent to a sampling engine. In one or more embodiments of the invention, the sampling engine performs some additional processing to obtain information related to sampled network traffic data units, aggregates the information related to some number of such samples, and sends the data to a network chip as a flow datagram. In one or more embodiments of the invention, the network chip further processes and/or packages the flow datagram, and then sends it to one or more collectors of sampled flow data (e.g., sFlow collectors). In one or more embodiments of the invention, the performance of activities related to network traffic sampling by the sampling engine and network chip reduces the workload on various other components of the network device, such as one or more network device processors, which may improve overall network device performance.

In one or more embodiments of the invention, one or more network chips and one or more sampling engines of a network device are included in the same line card of the network device, while other line cards of the network device may not include any sampling engines. In such embodiments of the invention, network traffic may be sampled for network chips on line cards without sampling engines by transmitting network traffic samples to sampling engines on line cards of the network device that include such sampling engines. In one or more embodiments of the invention, some or all of the functionality described herein as being performed by a sampling engine may additionally or alternatively be performed by one or more network chips.

FIG. 1 shows a system in accordance with one or more embodiments of the invention. As shown in FIG. 1, the system includes a network device (100). The network device (100) may include an accelerated sampling line card (102) and a non-accelerated sampling line card (104). In one or more embodiments of the invention, an accelerated sampling line card (102) includes one or more network chips (e.g., network chip A (106), network chip B (108)) and at least one sampling engine (114). In one or more embodiments of the invention, a non-accelerated sampling line card (104) includes one or more network chips (e.g., network chip C (106), network chip D (108)), but no sampling engines. Each of these components is described below.

In one or more embodiments of the invention, a network device (100) may be a physical device that includes and/or may operatively connected to persistent storage (not shown), memory (e.g., random access memory (RAM)) (not shown), one or more processor(s) (e.g., integrated circuits) (not shown), and two or more physical network interfaces or ports (not shown). In one or more embodiments of the invention, the one or more processors of a network device (e.g., a central processing unit) are separate components from a network chip, one or more of which may also be components of a network device, and are discussed further below. As used herein, the term operatively connected, or operative connection, means that there exists between elements/components a direct or indirect connection that allows the elements to interact with one another in some way. For example, such elements may exchange information, send instructions to perform actions, cause changes in state and/or operating condition, etc.

In one or more embodiments of the invention, a network device (100) includes functionality to receive network traffic data units (e.g., frames, packets, etc.) at any of the physical network interfaces of the network device and to process the network traffic data units to determine whether to: (i) drop the network traffic data unit; (ii) process the network traffic data unit in accordance with one or more embodiments of the invention; and/or (iii) transmit the network traffic data unit, based on the processing, from another physical network interface or port on the network device (100) in accordance with one or more embodiments of the invention.

In one or more embodiments of the invention, the network device (100) also includes software and/or firmware stored in any network device storage (not shown) and/or network device memory (not shown) (i.e., non-transitory computer readable mediums). Such software may include instructions which, when executed by the one or more processors (not shown) of the network device, cause the one or more processors to perform operations in accordance with one or more embodiments of the invention. The software instructions may be in the form of computer readable program code to perform embodiments of the invention may be stored, in whole or in part, temporarily or permanently, on a non-transitory computer readable medium such as a CD, DVD, storage device, a diskette, a tape, flash memory, physical memory, or any other computer readable storage medium. Specifically, the software instructions may correspond to computer readable program code that when executed by a processor(s), is configured to perform functionality related to embodiments of the invention. The functionality of a network device (100) is not limited to the aforementioned examples.

Examples of a network device (100) include, but are not limited to, a network switch, a router, a multilayer switch, a fibre channel device, an InfiniBand® device, etc. A network device (100) is not limited to the aforementioned specific examples.

In one or more embodiments of the invention, the network device (100) also includes any number of network chips (e.g., network chip A (106), network chip b (108), network chip C (110), network chip D (112)). In one or more embodiments of the invention, a network chip (106, 108, 110, 112) is any hardware (e.g., circuitry), software, firmware, and/or combination thereof that includes functionality to receive, process, and/or transmit network traffic data units in accordance with one or more embodiments of the invention. In order to perform such functionality, a network chip (106, 108, 110, 112) may include any number of components. Such components may include, but are not limited to, one or more processors, one or more buffers (e.g., for implementing receive and/or transmit queues, such as virtual output queues (VOQs)), any type or amount of non-volatile storage, and/or any type or amount of volatile storage (e.g., RAM). A network chip (106, 108, 110, 112) may also include and/or be operatively connected to any number of physical network interfaces (not shown) (e.g., transceivers) of the network device (100). Such interfaces may provide a path external to the network device (100) (e.g., to other devices), or may be operatively connected to other components internal to the network device (100), and each such interface may be an ingress and/or egress interface. In one or more embodiments of the invention, a network chip (106, 108, 110, 112) may be or include one ore more application specific integrated circuits (ASICs).

As a non-limiting example, a network chip may be hardware that receives network traffic data units at an ingress port, and determines out of which egress port on the network device (100) to forward the network traffic data units such as, for example, media access control (MAC) frames that may include Internet Protocol (IP) packets. Network chips are discussed further in the description of FIG. 2, below.

In one or more embodiments of the invention, one or more network chips (106, 108, 110, 112) may be included as part of a line card (e.g., accelerated line card (102) or a non-accelerated line card (104)). In one or more embodiments of the invention, a line card is a collection of hardware (e.g., circuitry) that includes functionality to provide operative connectivity between various network chips (106, 108, 110, 112) and other components (e.g., physical interface ports, processors, storage, memory, sampling engines, etc. and software components (see FIG. 3 description below)) of a network device. A network device may include any number of line cards without departing from the scope of the invention.

In one or more embodiments of the invention, an accelerated line card (102) is a line card that includes one or more sampling engines (114). In one or more embodiments of the invention, a sampling engine (114) is a collection of hardware (e.g., circuitry), software, firmware, and/or any combination thereof configured to perform at least a portion of the functionality described herein (e.g., an ASIC). For example, a sampling engine (114) may be a field programmable gate array (FPGA), which includes various circuitry components and storage (e.g., static random access memory (SRAM), flash memory, etc.) for storing computational logic and performing various operations based, at least in part, on such stored logic. A sampling engine (114) may be operatively connected to any number of network chips (e.g., network chips (106, 108) located on the same accelerated line card as the sampling engine, or indirectly connected network chips (110, 112) included in non-accelerated line cards (104)). In one or more embodiments of the invention, a sampling engine (114) includes functionality to receive sampled network traffic data units, to process the sampled network traffic data units to obtain flow samples, to aggregate such flow samples, and to propagate the aggregated flow samples and related information as flow datagrams towards one or more collectors (e.g., via one or more network chips and one or more physical network interfaces of the network device). Sampling engines are discussed further in the description of FIG. 2, below.

In one or more embodiments of the invention, a non-accelerated line card (104) is substantially similar to an accelerated line card (102), but without including any sampling engine(s). A network device (100) may have zero or more non-accelerated line cards without departing from the scope of the invention. In one or more embodiments of the invention that include at least one non-accelerated line card (104), each non-accelerated line card is operatively connected to at least one accelerated line card (102) of the network device (100).

While FIG. 1 shows a configuration of components, other configurations may be used without departing from the scope of the invention. For example, various components may be combined to create a single component. As another example, the functionality performed by a single component may be performed by two or more components. Accordingly, embodiments disclosed herein should not be limited to the configuration of components shown in FIG. 1.

Figure 2:
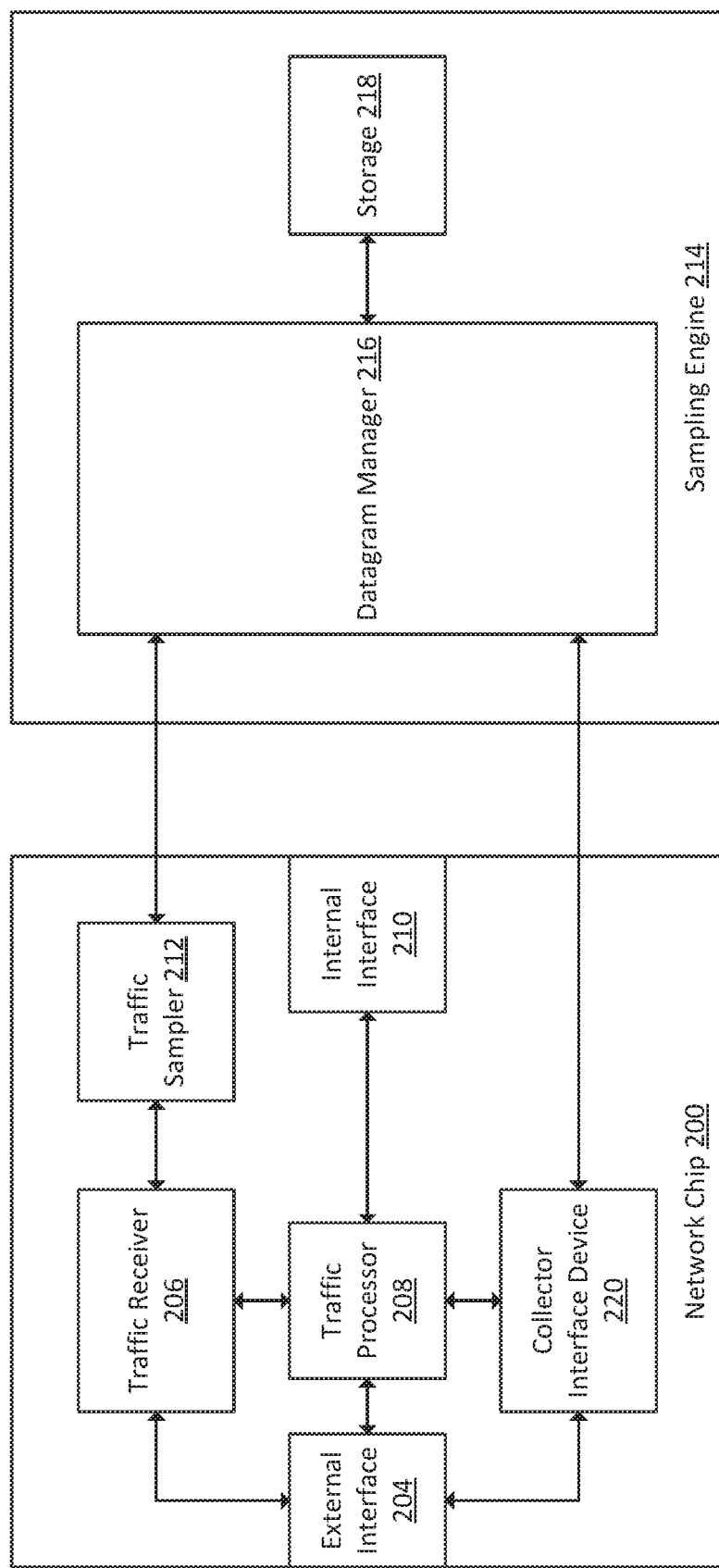
FIG. 2 shows a system in accordance with one or more embodiments of the invention.

FIG. 2 shows a network chip (200) coupled to a sampling engine (214) in accordance with one or more embodiments of the invention. In one or more embodiments of the invention, the network chip (200) and sampling engine (214) are each included in an accelerated line card (e.g., 102 from FIG. 1) of a network device (e.g., 100 from FIG. 1). Additionally or alternatively, the network chip (200) may be included in a non-accelerated line card and operatively connected to another network chip that is included in an accelerated line card that also includes the sampling engine (214). In one or more embodiments of the invention, a network chip (200) includes an external interface (204), a traffic receiver, (206), a traffic processor (208), and internal interface (210), a traffic sampler (212), and a collector interface device (220). In one or more embodiments of the invention, a sampling engine includes a datagram manager (216) and storage (218). Each of these components is described below.

In one or more embodiments of the invention, a network device chip (200) is substantially similar to the network device chips (106, 108, 110, 112) discussed above in the description of FIG. 1, above, and the components of the network chip shown in FIG. 2 are implemented using all or any portion of the hardware, software, firmware, etc. described above as being included in a network device chip (200).

In one or more embodiments of the invention, the network chip includes an external interface (204). In one or more embodiments of the invention, an external interface is hardware (e.g., circuitry) and/or software that is operatively connected to one or more physical network interfaces (e.g., optical transceivers), which provide an interface to other devices on a network (e.g., computing devices (not shown), other network devices (not shown), etc.). In one or more embodiments of the invention, an external interface (204) includes functionality to receive network traffic data units and/or transmit network traffic data units that have been processed by one or more network chips of a network device.

In one or more embodiments of the invention, the network chip (200) includes a traffic receiver (206). In one or more embodiments of the invention, a traffic receiver (206) is any hardware (e.g., circuitry), software, firmware, or any combination thereof, that includes functionality to receive network traffic data units from an operatively connected external interface (204) of a network chip (200), and to determine whether to capture (e.g., mirror/copy) a given network traffic data unit in order to sample the network data traffic unit. In one or more embodiments of the invention, a traffic receiver (206) includes functionality to capture network traffic data units based on a traffic sampling rate, which may be pre-configured for a network chip (200) and/or may be configurable (e.g., by a network device user, by software executing on the network device, etc.). As an example, the traffic receiver (206) may include functionality to count the number of received network traffic data units, and capture one out of every thousand network traffic data units in order to sample the network traffic flow. In one or more embodiments of the invention, the traffic receiver is also operatively connected to a traffic processor (208) (discussed below) and includes functionality to propagate received network traffic data units to the traffic processor (206) for processing.

In one or more embodiments of the invention, the network chip (200) includes a traffic sampler (212). In one or more embodiments of the invention, a traffic sampler (212) is any hardware (e.g., circuitry), software, firmware, or any combination thereof that includes functionality to receive network traffic data units that have been captured for sampling by an operatively connected traffic receiver (206). In one or more embodiments of the invention, the traffic sampler (212) includes functionality to perform processing and/or obtain from other network chip components (e.g., traffic processor (208)) various items of information related to a captured network traffic data unit. Such information may include, but is not limited to, the ingress interface of the network traffic data unit, the egress interface of the network traffic data unit, an ingress or egress virtual local area network (VLAN) associated with the network traffic data unit, a next hop device for the network traffic data unit, a reverse path determined using the source of the network traffic data unit, a network tunneling protocol network segment associated with the network traffic data unit, etc.

A traffic sampler (212) may include functionality to include any or all information relating to the network traffic data unit as part of a header (i.e., a sampling header), and to prepend or append such a header to the network data traffic unit. In one or more embodiments of the invention, a network traffic data unit with such a header prepended is referred to as a sampled network traffic data unit (see description of FIG. 4A, below). Other headers (e.g., an Ethernet header) may also be prepended or appended to the sampled network traffic data unit by the traffic sampler (212) without departing from the scope of the invention.

In one or more embodiments of the invention, the traffic sampler (212) is operatively connected to a dedicated interface (not shown) that provides an operative connection to a sampling engine (214). In one or more embodiments of the invention, the traffic sampler (212) includes functionality to transmit a sampled network traffic data unit to the sampling engine (214) using such a dedicated interface, which may be an otherwise unused interface of the network chip (200).

In one or more embodiments of the invention, a traffic processor (208) is any hardware (e.g., circuitry), software, firmware, or any combination thereof, that includes functionality to process received network traffic data units. As discussed above in the description of FIG. 1 with respect to network chips, a traffic processor (208) may include functionality to receive network traffic data units, process network traffic data units to determine what action should be taken (e.g., extract information, determine where to send the network traffic data unit, drop the network traffic data unit, etc.) in response to receipt of the network traffic data units. In one or more embodiments of the invention, the traffic processor (208) is operatively connected to an external interface (204), a traffic receiver (206), an internal interface (210), and/or a collector interface device (220).

In one or more embodiments of the invention, the network chip (200) includes an internal interface (210). In one or more embodiments of the invention, an internal interface (210) is any hardware (e.g., circuitry), software, firmware, or any combination thereof, that is operatively connected to other components internal to a network device. In one or more embodiments of the invention, an internal interface (210) includes functionality to receive network traffic data units (e.g., from a traffic processor (208)) and transmit such network traffic data units to other components of a network device (e.g., other network chips). As an example, a traffic processor (208) may receive a network traffic data unit, process the network traffic data unit to determine that it should be sent from a physical interface operatively connected to a network chip of another line card of a network device, and, based on the processing, send the network traffic data unit to the appropriate internal interface (210) that provides operative connectivity to the other network chip.

In one or more embodiments of the invention, the network chip (200) includes a collector interface device (220). In one or more embodiments of the invention, a collector interface is any hardware (e.g., circuitry), software, firmware, or any combination thereof, that include functionality to receive flow datagrams (see description of FIG. 4C, below) from an operatively connected sampling engine (214). In one or more embodiments of the invention, the collector interface device (220) is operatively connected to the sampling engine (214) via a dedicated interface (not shown) of the network chip (200), which may or may not be the same dedicated interface that operatively connects the sampling engine to the traffic sampler (212) (discussed above). In one or more embodiments of the invention, the collector interface device (220) includes functionality to provide flow network traffic data units (see FIG. 4D, below) to the traffic processor (208) to be propagated towards one or more collector devices (e.g., via an external interface (204) or internal interface (210) of the network chip (200)).

In one or more embodiments of the invention, a sampling engine (214) is substantially similar to the sampling engine (114) discussed above in the description of FIG. 1, above, and the components of the sampling engine (214) shown in FIG. 2 are implemented using all or any portion of the hardware, software, firmware, storage, etc. described above as being included in a sampling engine.

In one or more embodiments of the invention, the sampling engine (214) includes and/or is operatively connected to storage (218). In one or more embodiments of the invention, the storage (218) is any form of data storage (e.g., SRAM, flash memory, etc.). In one or more embodiments of the invention, the storage (218) includes functionality to store flow samples. In one or more embodiments of the invention, a flow sample is at least a portion of a network traffic data unit, with a header prepended including additional information related to the network traffic data unit (i.e., sample information). Flow samples are discussed further in the description of FIG. 4B, below.

In one or more embodiments of the invention, the sampling engine (214) includes a datagram manager (216). In one or more embodiments of the invention, a datagram manager (216) is any hardware (e.g., circuitry), software, firmware, stored logic, etc. that includes functionality to receive sampled network traffic data units, to process the received network data traffic units to obtain flow samples, to store the flow samples in operatively connected storage (216), to construct flow datagrams using the flow samples, and to send the flow datagrams to a network chip to be propagated towards a one or more collectors.

While FIG. 2 shows a configuration of components, other configurations may be used without departing from the scope of the invention. For example, various components may be combined to create a single component. As another example, the functionality performed by a single component may be performed by two or more components. Also, although FIG. 1 and FIG. 2 show a sampling engine separate from network chips, one of ordinary skill in the art and having the benefit of this Detailed Description will appreciate that some or all of the functionality of the sampling engine may alternately be performed by a network chip. Accordingly, embodiments disclosed herein should not be limited to the configuration of components shown in FIG. 2.

Figure 3:
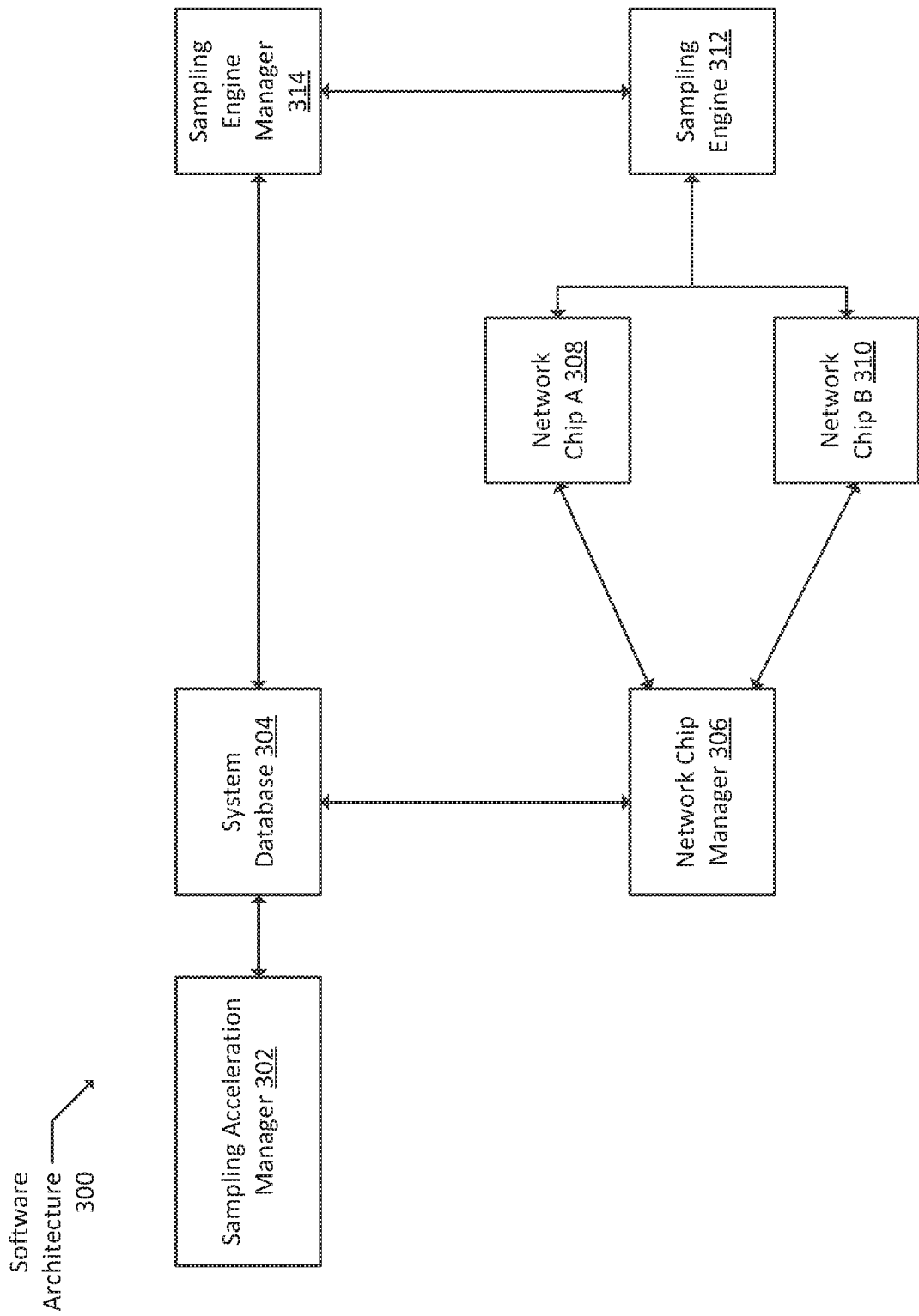
FIG. 3 shows a system in accordance with one or more embodiments of the invention.

FIG. 3 shows a software architecture (300) in accordance with one or more embodiments of the invention. As shown in FIG. 3, the software architecture (300) includes a sampling acceleration manager (302), a system database (304), a sampling engine manager (314), a network chip manager (306), any number of network chips (e.g., network chip A (308), network chip B (310)), and any number of sampling engines (e.g., sampling engine (312)). Each of these components is described below. In one or more embodiments of the invention, the software architecture (300) shown in FIG. 3 executes on hardware of a network device (e.g., one or more processors), and functions to manage the hardware and/or software components (e.g., network chips, sampling engines, software agents, etc.) of the accelerated network traffic sampling described herein.

In one or more embodiments of the invention, the network chips (308, 310) and sampling engines (312, 314) shown in FIG. 3 are substantially similar to the network chips and sampling engines discussed above in the descriptions of FIG. 1 and FIG. 2.

In one or more embodiments of the invention, the software architecture (300) includes a sampling acceleration manager (302). In one or more embodiments of the invention, the sampling acceleration manager (302) includes software instructions stored at least temporarily on the storage or memory of a network device (e.g., network device (100) of FIG. 1) that are executed by one or more processors of the network device to perform various operations. Such operations may be related to management of network traffic sampling acceleration from a network device point of view (e.g., rather than a single sampling engine, line card, or network chip). Such operations may include, but are not limited to, tracking insertions and removals of accelerated line cards and non-accelerated line cards, load balancing network chips among available sampling engines of accelerated line cards, maintaining data related to acceleration related capabilities within the system in a system database (304) (e.g., line card X supports acceleration, line card Y does not, etc.), and managing and/or initiating execution of a software agent (not shown) that performs functionality relating to network traffic sampling (e.g., monitoring counters). As a non-limiting example, a network device processor (not shown) may include functionality execute a software agent configured to gather information from any number of counters of the network device, and to initiate transmission of such information towards an entity configured to receive such information, such as a collector executing on a different physical or virtual device that collects information related to network traffic flow (e.g., an sFlow collector). In such an example, the counters may count any type of recurring event, such as a quantity of network traffic data units processed by all sampling engines of a network device in a given time period, a total number of flow datagrams generated by sampling engines of the network device in a given time period, etc. In one or more embodiments of the invention, the sampling acceleration manager manages, configures, and/or coordinates the actions, at least in part, of such a software agent.

In one or more embodiments of the invention, the software architecture (300) includes a system database (304). In one or more embodiments of the invention, a system database (304), as used herein, is any type of storage unit and/or device (e.g., a file system, database, collection of tables, or any other storage mechanism) for storing data. Further, the system database (304) may include multiple different storage units and/or devices. In one or more embodiments of the invention, the system database stores information related to accelerating network traffic sampling, configuring network chips, and/or configuring sampling engines, etc.

In one or more embodiments of the invention, the software architecture includes any number of network chip managers (306). In one or more embodiments of the invention, a network chip manager (306) includes software instructions stored at least temporarily on the storage or memory of a network device that are executed by one or more processors of the network device to perform various operations related to configuring and managing network chips. Such operations may include, but are not limited to, configuring the coupling between a given network chip and a sampling engine, configuring the network chip to sample network traffic data units at a certain sampling rate, configuring a network chip to prepend or append a sampling header to a sampled network traffic data unit before transmitting the sampled network traffic data unit towards a sampling engine either directly or via another network chip, and/or configuring interfaces, VOQs, etc. The software architecture (300) may include any number of network chip managers, with each managing any number of network chips, without departing from the scope of the invention.

In one or more embodiments of the invention, the software architecture (300) includes a sampling engine manager (314). In one or more embodiments of the invention, a sampling engine manager (314) includes software instructions stored at least temporarily on the storage or memory of a network device that are executed by one or more processors of the network device to perform various operations related to configuring and managing/controlling sampling engines. For example, in embodiments of the invention that include an SRAM based FPGA as a sampling engine, a sampling engine manager is responsible for configuring the logic used by the FPGA to perform the functionality of the sampling engine as described herein, at least in part, by implementing the logic in the SRAM of the FPGA. The software architecture (300) may include any number of sampling managers, with each managing any number of sampling engines, without departing from the scope of the invention.

While FIG. 3 shows a configuration of components of a software architecture, other configurations may be used without departing from the scope of the invention. For example, various components may be combined to create a single component. As another example, the functionality performed by a single component may be performed by two or more components. Accordingly, embodiments disclosed herein should not be limited to the configuration of components shown in FIG. 3.

Figure 4A:
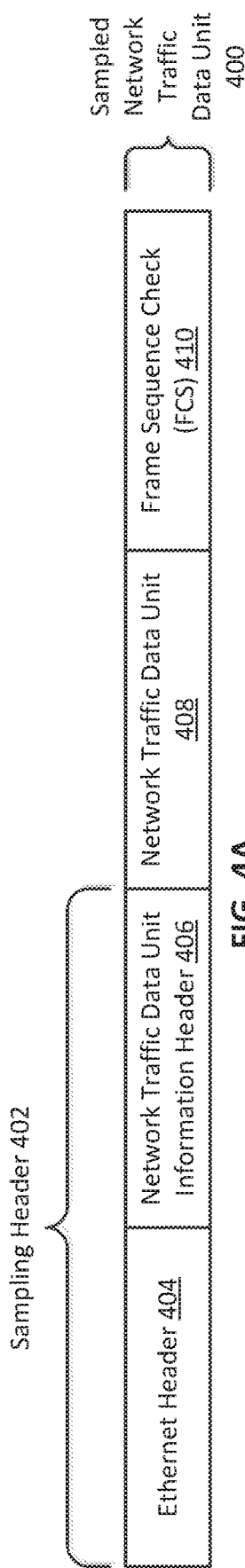
FIG. 4A shows an exemplary sampled network traffic data unit structure in accordance with one or more embodiments of the invention.

FIG. 4A shows an exemplary sampled network traffic data unit structure in accordance with one or more embodiments of the invention. The following example is for explanatory purposes only and not intended to limit the scope of the invention.

As shown in FIG. 4A, the sampled network traffic data unit (400) includes a network traffic data unit (408), a frame sequence check (FCS) (410), and a sampling header (402). The sampling header may include a network traffic data unit information header (406) and an Ethernet header (404). Each of these components is described below.

In one or more embodiments of the invention, the sampled network traffic data unit (400) is generated by a network chip. In one or more embodiments of the invention, the sampled network traffic data unit (400) includes a network traffic data unit (408) that was captured by the network chip according to a sampling rate of the network chip. For example, a network chip may be configured to capture one out of every 1,000 received media access control (MAC) frames received by a network device at a given physical network interface. In one or more embodiments of the invention, the network traffic data unit (408) includes a payload (not shown) and any headers (e.g., MAC information, TCP/IP information, etc.) that have been prepended or appended to the payload before its receipt by the network chip.

In one or more embodiments of the invention, the sampled network traffic data (400) unit includes a sampling header (402), which includes at least a network traffic data unit information header (406), and may optionally also include an Ethernet header (404). In one or more embodiments of the invention, network traffic data unit information header (406) is prepended or appended to a captured network traffic data unit (408) by a network chip. The network traffic data unit information header (406) may include information related to the network traffic data unit (408) including, but not limited to, original source information, original destination information, ingress interface, egress interface (or multiple egress interfaces if the network traffic data unit is to be multicast from the network device), ingress VLAN, egress VLAN, tunneling protocol network segment (ingress and/or egress), reverse path information, a sampling rate, and/or any other data relevant to the network traffic data unit (408) and/or to a flow sampling system (e.g., sFlow). In one or more embodiments of the invention, an Ethernet header (404), if included in the sampling header, includes Ethernet information (e.g., source MAC address, destination MAC address, etc.) that may or may not convey useful information to a sampling engine or be used, in part, in order to transmit the sampled network traffic data unit (400) towards the sampling engine.

The sampling header may also include information that identifies certain characteristics of a network traffic data unit that may be relevant to a collector implementing a network traffic analyzer standard. As a non-limiting example, if the network traffic analyzer standard being implemented is sFlow, the content of the sampling header relating to an egress interface may be varied. In such an example, a regular unicast network traffic data may maintain the correct egress interface, a multicast network traffic data may have an unknown interface set, a network traffic data intended for a processor of the network device that includes the network chip adding the sampling header may have the egress interface set to identify the network device, and a network traffic data that is to be dropped (e.g., due to a rule within an access control list (ACL)) may have the egress interface set to indicate that the network traffic data is to be dropped.

In one or more embodiments of the invention, the sampled network traffic data unit (400) includes a FCS (410). In one or more embodiments of the invention, a FCS (410) is an error detecting code that is added to the sampled network traffic data unit, and may or may not be used (e.g., by a sampling engine) to determine if the sampled network traffic data unit (400) is damaged in some way.

Figure 4B:
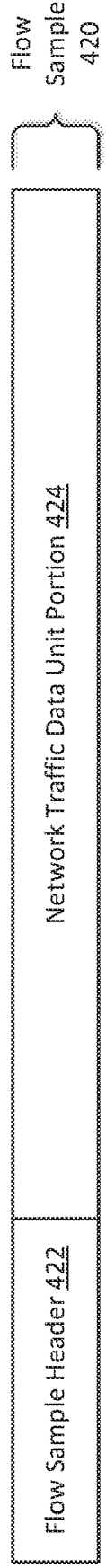
FIG. 4B shows an exemplary flow sample structure in accordance with one or more embodiments of the invention.

FIG. 4B shows an exemplary flow sample structure in accordance with one or more embodiments of the invention. The following example is for explanatory purposes only and not intended to limit the scope of the invention.

As shown in FIG. 4B, the flow sample (420) includes a network traffic data unit portion (424) and a flow sample header (422). Each of these components is described below.

In one or more embodiments of the invention, a flow sample (420) is generated by a sampling engine using a sampled network traffic data unit (e.g., sampled network traffic data unit (400) of FIG. 4A) received from a network chip. In one or more embodiments of the invention, the flow sample (420) is generated by determining or obtaining various items of information related to the network traffic data unit (408) of the sampled network traffic data unit (400) (e.g., information from the sampling header (402), a size of the network traffic data unit, etc., which may collectively be referred to as sample information) and using such items of information to include in a flow sample header (422), which is prepended or appended to a network traffic data unit portion (424). In one or more embodiments of the invention, the network traffic data unit portion (424) is a truncated portion (e.g., 128 bytes) of the network traffic data unit (408) included in the received sampled network traffic data unit (400). As an example, a truncated portion may be the first 128 bytes of the network traffic data unit. In one or more embodiments of the invention, the truncated portion includes at least the one or more headers prepended to the payload of the network traffic data unit. In one or more embodiments of the invention, a flow sample (420) is stored in storage of a sampling engine at least until they are included in a flow datagram (described below).

Figure 4C:
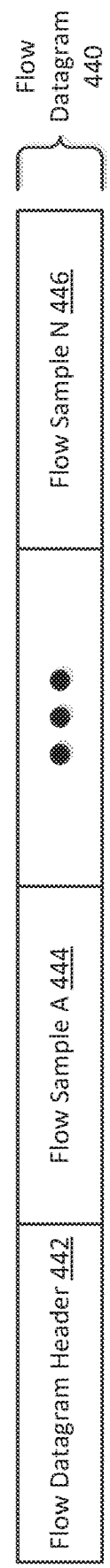
FIG. 4C shows an exemplary flow datagram structure in accordance with one or more embodiments of the invention.

FIG. 4C shows an exemplary flow datagram structure in accordance with one or more embodiments of the invention. The following example is for explanatory purposes only and not intended to limit the scope of the invention.

As shown in FIG. 4C, the flow datagram (440) includes a flow datagram header (442) and one or more flow samples (e.g., flow sample A (444), flow sample N (446)). Each of these components is described below.

In one or more embodiments of the invention, the flow samples (444, 446) included in the flow datagram (440) are set of flow samples created by the sampling engine (such as the flow sample discussed above in the description of FIG. 4B), and are obtained from storage of the sampling engine. In one or more embodiments of the invention, the quantity of flow samples included in a given flow datagram (and, thus, the size of the flow datagram) is based, at least in part, on a maximum transmission unit (MTU) size associated with a path to one or more collectors In one or more embodiments of the invention, the flow datagram header (442) includes, but is not limited to, a sampling technology version number (e.g., sFlow version number), IP version (e.g., IPv4, IPv6), an IP address of a software agent executing on the network device, a flow datagram sequence number, an uptime of the network device, a number of flow samples included in the flow datagram (440), and/or any other information related to the flow samples, the flow datagram, the network device, the sampling engine, etc. In one or more embodiments of the invention, the flow datagram header (442) also includes at least a portion of a user datagram protocol (UDP) header, such as, for example, a UDP port number for directing the flow datagram to a collector executing on a destination computing device. The flow datagram header (422) may include additional and/or different information without departing from the invention.

Figure 4D:
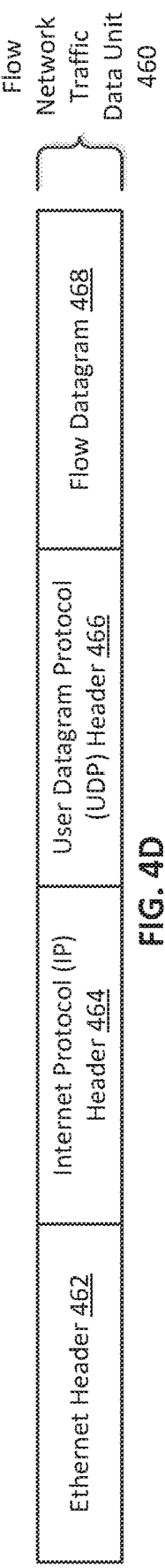
FIG. 4D shows an exemplary flow network traffic data unit structure in accordance with one or more embodiments of the invention.

FIG. 4D shows an exemplary flow network traffic data unit structure in accordance with one or more embodiments of the invention. The following example is for explanatory purposes only and not intended to limit the scope of the invention.

As shown in FIG. 4D, the flow network traffic data unit (460) includes an Ethernet header (462), an IP header (464), a UDP header (466), and a flow datagram (468).

In one or more embodiments of the invention, the flow datagram (468) included in the flow network traffic data unit (460) is substantially similar to the flow datagram (440) discussed above in the description of FIG. 4C.

In one or more embodiments of the invention, each of the Ethernet header (462), the IP header (464), and the UDP header (466) is used, at least in part, to propagate the flow datagram towards one or more collectors (e.g., sFlow collectors). In one or more embodiments of the invention, the Ethernet header (462), the IP header (464), and the UDP header (466) are added by the network chip after receipt of a flow datagram from a sampling engine, by a sampling engine before sending the flow datagram to a network chip, or by a combination of the sampling engine and the network chip. For example, the sampling engine may add a UDP header intended to get the flow datagram to the collector application executing on a computing device, and the Ethernet and IP headers may be added by the network chip in order to propagate the flow datagram and UDP header through a network to the computing device on which the collector executes. In one or more embodiments of the invention, the Ethernet header includes at least a source and a destination MAC address, and the IP header includes at least a source and a destination IP address. In one or more embodiments of the invention, the UDP header includes at least a UDP port number. Although FIG. 4D shows a flow network traffic data unit (460) as including an Ethernet header, and IP header, and a UDP header, one of ordinary skill in the art and having the benefit of this Detailed Description will appreciate that headers of other network protocols may additionally or alternatively be prepended or appended to a flow datagram in order to propagate the flow datagram towards one or more collectors.

FIG. 5, FIG. 6, FIG. 7, and FIG. 8 show flowcharts in accordance with one or more embodiments of the invention. While the various steps in the flowcharts are presented and described sequentially, one of ordinary skill in the art and having the benefit of this Detailed Description will appreciate that some or all of the steps may be executed in different orders, may be combined or omitted, and some or all of the steps may be executed in parallel. Furthermore, the steps may be performed actively or passively. For example, some steps may be performed using polling or be interrupt driven in accordance with one or more embodiments of the invention. By way of an example, determination steps may not require a processor or other device component to process an instruction unless a condition exists (e.g., a sampling rate dictates a network traffic data unit should be sampled) in accordance with one or more embodiments of the invention.

Figure 5:
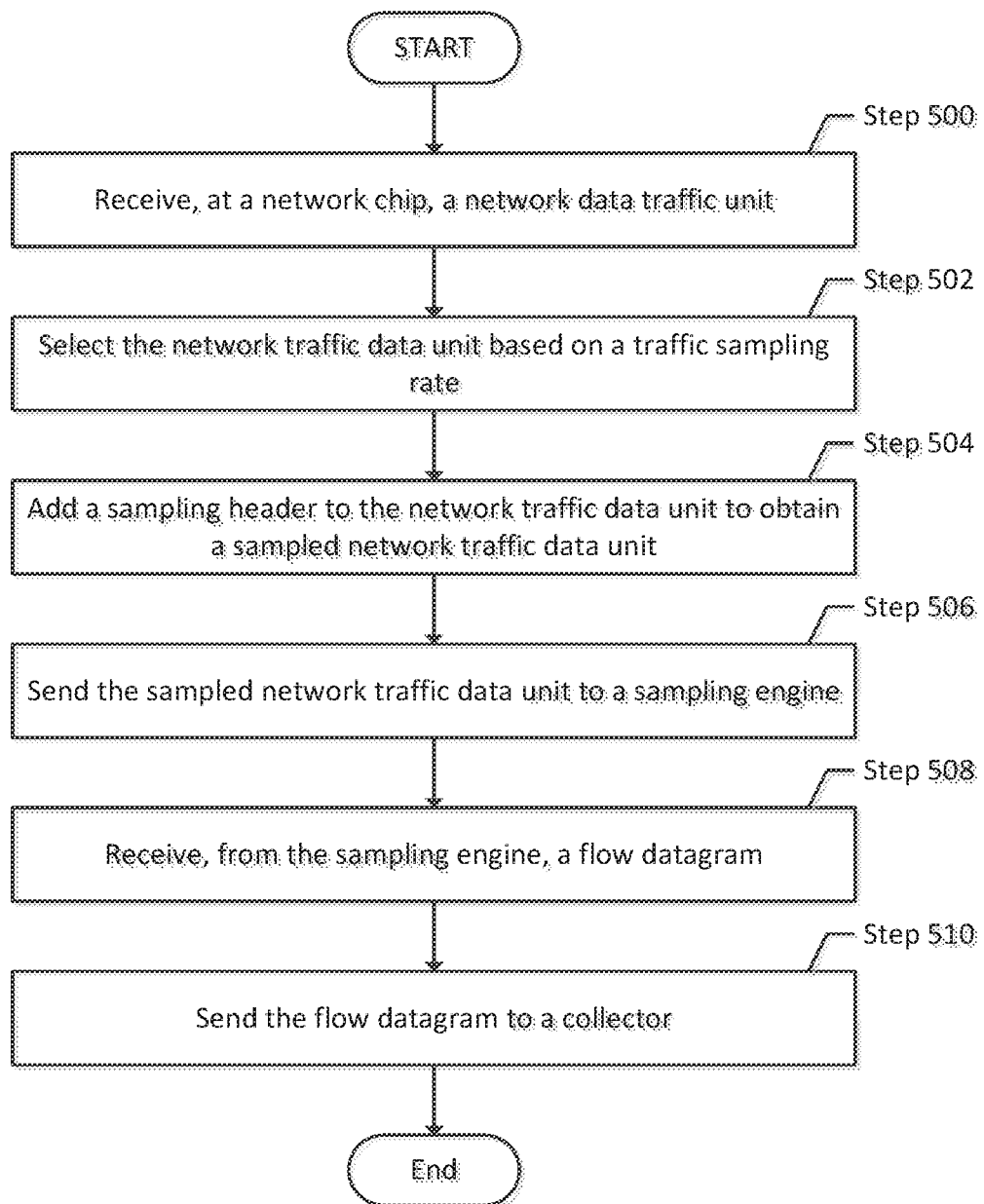
FIG. 5 shows a flowchart in accordance with one or more embodiments of the invention.

FIG. 5 shows a flowchart describing a method for accelerating network traffic sampling in accordance with one or more embodiments of the invention.

In Step 500, a network traffic data unit is received at a network chip of a network device. For example, a network data traffic unit, such as a MAC frame and/or an IP packet, is transmitted from some other device, such as a computing device or another network device, towards a destination. In such scenarios, a network device that includes a network chip may receive the network data traffic unit in order to process the network data traffic unit and, if appropriate, propagate the network data traffic unit towards the destination. In one or more embodiments of the invention, a network data traffic unit is received at a physical network interface of the network device, and then propagated to the network chip.

In Step 502, the network chip that received the network data traffic unit in Step 500 selects/captures the network data traffic unit based on a network traffic sampling rate. In one or more embodiments of the invention, selecting/capturing a network data traffic unit includes mirroring the network data traffic unit, which may include generating a copy of the network traffic data unit and then storing the generated copy. In one or more embodiments of the invention, the sampling rate is any rate that is pre-configured and/or configurable for the network chip and determines the rate of sampling from received network data traffic units. For example, the sampling rate may dictate that the network chip capture one of every 2,000 network data traffic units that are received by the network chip. The sampling rate may apply to the network chip as a whole, to an external interface of a network chip, to a physical network interface operatively connected to the network chip, etc.

In Step 504, a sampling header is added to the network data traffic unit by the network chip. In one or more embodiments of the invention, the sampling header includes any information related to the network traffic data unit, and may be added to the network data traffic unit by prepending or appended the sampling header to the network data traffic unit, in order to obtain a sampled network traffic data unit.

In Step 506, the sampled network traffic data unit is transmitted to a sampling engine. In one or more embodiments of the invention, the network chip includes a sampling engine, and, thus transmitting the sampled network data traffic unit to the sampling engine includes propagating the sampled network data traffic unit to the portion of the network chip implementing the functionality of the sampling engine. In other embodiments of the invention, the sampling engine is separate from the network chip, and an operative connection exists between the sampling engine and the network chip that is configured for the transmission of the sampled network data traffic unit from the network chip to the sampling engine. For example, one of the internal interfaces of the network chip may be a dedicated connection to the sampling engine, and the sampled network data traffic unit is transmitted over the direct coupling. In one or more embodiments of the invention, a dedicated connection is a connection that is only used for transmitting data between two elements, such as a network chip and a sampling engine.

As another example, the network traffic data unit may be received by a network chip of a non-accelerated line card, and such a network chip may propagate the sampled network traffic data unit to a network chip of an accelerated line card connected to a sampling engine via a dedicated connection, with such propagation using a configured VOQ of the network chip of the non-accelerated line card.

As another example, a network chip of a non-accelerated line card may prepend or append information to a captured network traffic data unit and send, via a configured VOQ, the network traffic data unit to a network chip of an accelerated line card which, in turn, creates a sampled network traffic data unit with a sampling header based on the information prepended or appended by the network chip of the non-accelerated line card. In such an example, the network chip of the accelerated line card then transmits the sampled network traffic data unit to a sampling engine via a dedicated interface.

In Step 508, a flow datagram is received from a sampling engine. In one or more embodiments of the invention, the flow datagram includes a quantity of one or more flow samples, each generated based on a sampled network data traffic unit processed by the sampling engine. In one or more embodiments of the invention, the network chip further processes the flow datagram in order to prepare the flow datagram for transmission to one or more collectors. For example, the flow datagram may include information, such as a UDP header, that allows the network chip to determine that the flow datagram is to be sent to two sFlow collectors, each operatively connected to a separate physical network interface of the network device. In such an example, the network chip may determine Ethernet and/or IP information related to the destination collectors, make a copy of the flow datagram (so one exists for each collector), prepend or append the respective collector-related information to the flow datagram and copy to obtain two flow network data traffic units, one for each identified collector.

In Step 510, the flow network data traffic unit is sent towards one or more collectors. In one or more embodiments of the invention, the various headers prepended or appended to the flow datagram in Step 508 are used to determine where to transmit the flow network data traffic unit in order to propagate the flow network data traffic unit towards the one or more collectors. Continuing the example from Step 508, one flow network data traffic unit in the example may be propagated towards a first destination collector directly from an external interface of the network chip, and the other flow network data traffic unit in the example may be propagated towards a second destination collector by transmitting the flow network traffic data unit, via an internal interface of the network chip, through the internal fabric of the network device to another network chip which, in turn, propagates the second flow datagram towards the second collector via an external interface of the second network chip.

Figure 6:
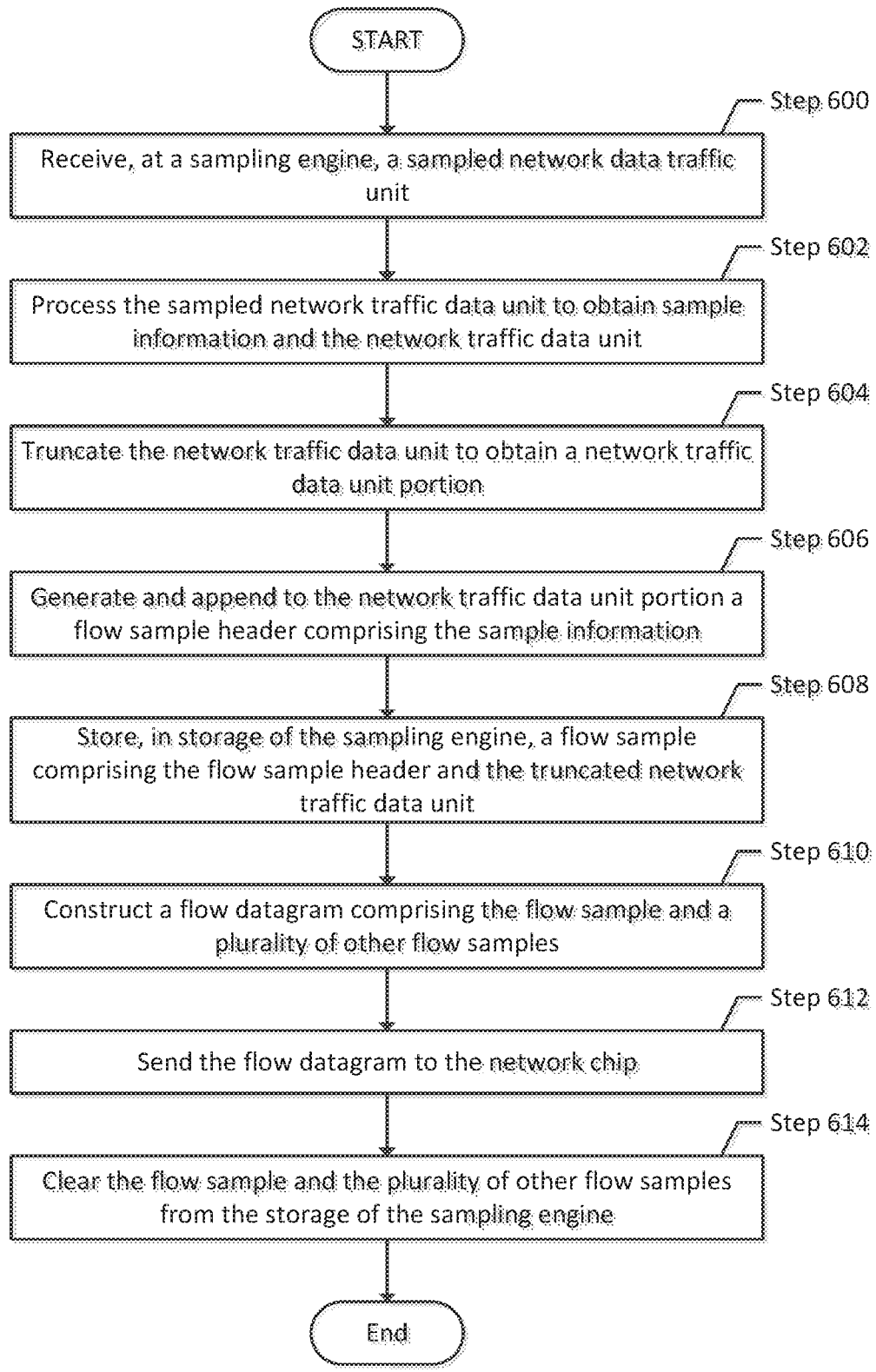
FIG. 6 shows a flowchart in accordance with one or more embodiments of the invention.

FIG. 6 shows a flowchart describing a method for accelerating network traffic sampling in accordance with one or more embodiments of the invention.

In Step 600, a sampled network traffic data unit is received at a sampling engine. In one or more embodiments of the invention, the sampled network traffic data unit is received from a network chip, and includes a network traffic data unit and a sampling header.

In Step 602, the sampled network traffic data unit is processed by the sampling engine to obtain information related to the network traffic data unit and the network traffic data unit. In one or more embodiments of the invention, the network traffic data unit obtained is used to determine the size of the network traffic data unit. Information included in the sampling header (see description of FIG. 4A, above) of the received sampled network traffic data unit, the size of the network traffic data unit, and any other information related to the network traffic data unit may be referred to as sample information.

In Step 604, the network traffic data unit obtained in Step 602 is truncated to obtain a network traffic data unit portion. In one or more embodiments of the invention, truncating the network traffic data unit includes shortening the network traffic data unit by removing some of the network traffic data unit. For example, truncation of a network traffic data unit may include removing all but the first 256 bytes of the network traffic data unit. In one or more embodiments of the invention, truncation of the network traffic data unit occurs so that each flow sample including a truncated network traffic data unit is smaller (e.g., less bytes than the entire network traffic data unit), which may allow for more flow samples to be included in a given flow datagram.

In Step 606, a flow sample header is generated using the sample information. In one or more embodiments of the invention, the flow sample header is prepended or appended to the network traffic data unit portion to obtain a flow sample.

In Step 608, the flow sample generated in Step 606 is stored in storage of the sampling engine, which may be storage included in and/or operatively connected to the sampling engine.

In Step 610, a flow datagram is constructed using the flow sample and a plurality of other flow samples. In one or more embodiments of the invention, the sampling engine stores any number of flow samples before aggregating the flow samples into a flow datagram. In one or more embodiments of the invention, the number of flow samples to be included in a given flow datagram is determined based on a maximum transmission unit (MTU) size available on a path to one or more collectors. In one or more embodiments of the invention, the MTU size is known to the sampling engine via configuration of the sampling engine by a sampling engine manager. In one or more embodiments of the invention, the construction of the flow datagram also includes prepending or appending to the flow samples a flow datagram header (see description of FIG. 4C, above). In one or more embodiments of the invention, the flow datagram header includes information related to the flow samples, as well as information identifying one or more collectors to which the flow datagram is to be transmitted.

In Step 612, the flow datagram constructed in Step 610 is transmitted to a network chip. The flow datagram may be transmitted to the network chip via the same dedicated interface on which the sampled network traffic data unit was received in Step 600, or via a different dedicated interface (which may be coupled to the same or a different network chip).

In Step 614, the flow samples that where included in the flow datagram in Step 610 and sent to the network chip in Step 612 are cleared from the storage of the sampling engine.

Figure 7:
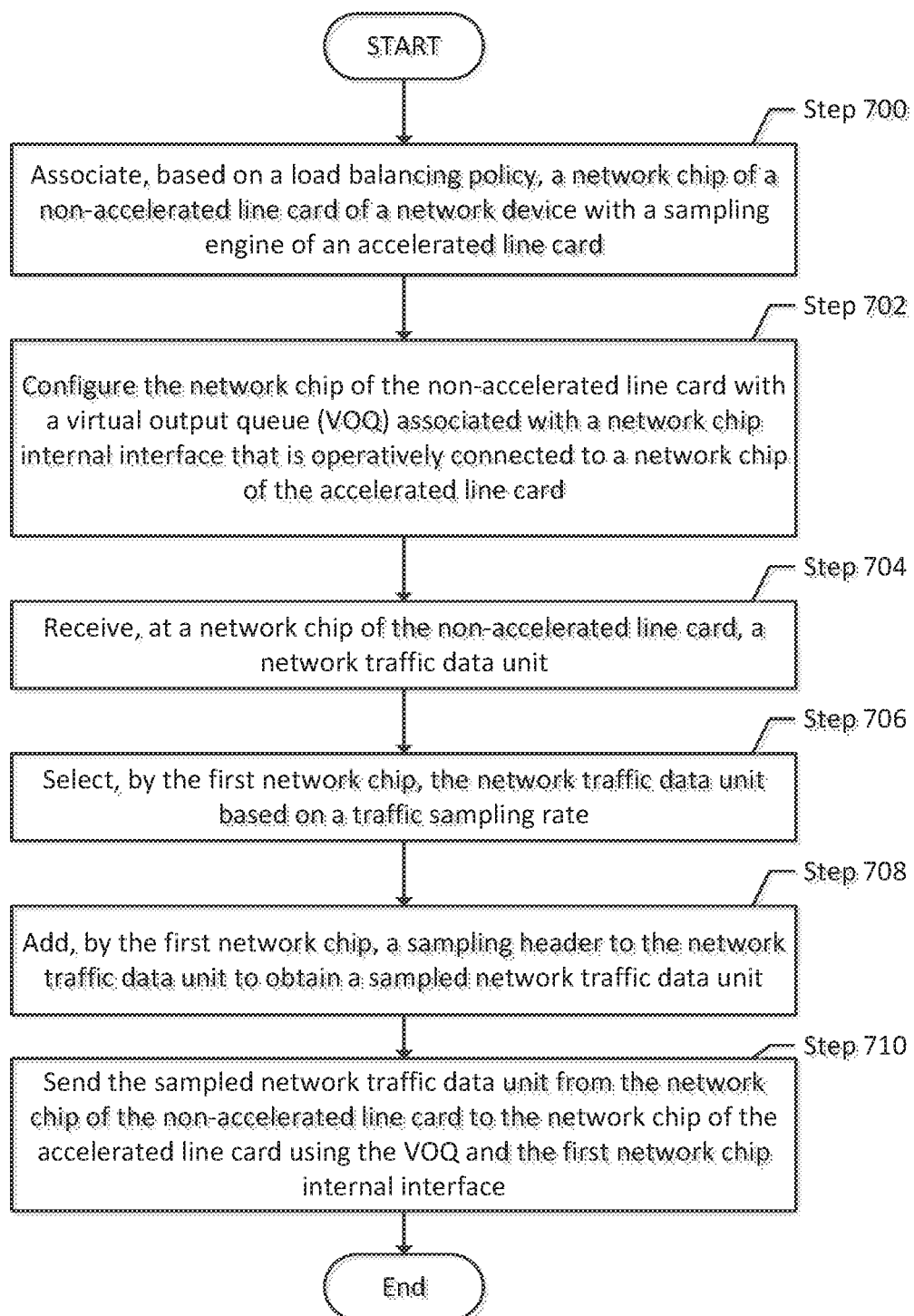
FIG. 7 shows a flowchart in accordance with one or more embodiments of the invention.

FIG. 7 shows a flowchart describing a method for accelerating network traffic sampling in accordance with one or more embodiments of the invention.

In Step 700, a network chip of a non-accelerated line card is associated with a sampling engine of an accelerated line card. In one or more embodiments of the invention, the network chip of the non-accelerated line card is associated with the sampling engine of the accelerated line card based on a load balancing policy such as, for example, a round robin policy, a least connections policy, a policy based on physical proximity of the accelerated and non-accelerated line card, any combination of load balancing policies, etc. Such a load balancing policy may be designed to balance the workload related to network traffic flow sampling among the sampling engines in a network device.

In Step 702, the network chip of the non-accelerated line card is configured with a virtual output queue (VOQ) that is associated with an internal interface of the network chip of the non-accelerated line card. In one or more embodiments of the invention, the internal interface associated with the configured VOQ is operatively connected to a network chip on the same accelerated line card as the sampling engine.

In Step 704, a network traffic data unit is received at the network chip of the non-accelerated line card. In one or more embodiments of the invention, the network traffic data unit is received from a device external to the network device at a physical network interface of the network device, and propagated to an external interface of the network chip of the non-accelerated line card.

In Step 706, the network traffic data unit received by the network chip of the non-accelerated line card in Step 704 is selected by the network chip to be sampled. In one or more embodiments of the invention, the selection of the network traffic data unit is based on a traffic sampling rate configured for the network chip of the non-accelerated line card.

In Step 708, the network chip of the non-accelerated line card adds a sampling header to the network traffic data unit to obtain a sampled network traffic data unit. Although not shown in FIG. 7, the sampling header, in some embodiments of the invention, is instead prepended or appending to the network traffic data unit by a network chip of the accelerated line card with the associated sampling engine based on internal headers that are added to the network traffic data unit by the network chip of the non-accelerated line card before the network traffic data unit is transmitted via the VOQ to the network chip of the accelerated line card.

In Step 710, the sampled network traffic data unit is transmitted from the network chip of the non-accelerated line card to a network chip of an accelerated line card that includes the associated sampling engine. In one or more embodiments of the invention, the sampled network traffic data unit is transmitted to the network chip of the accelerated line card using the VOQ configured in Step 702.

Figure 8:
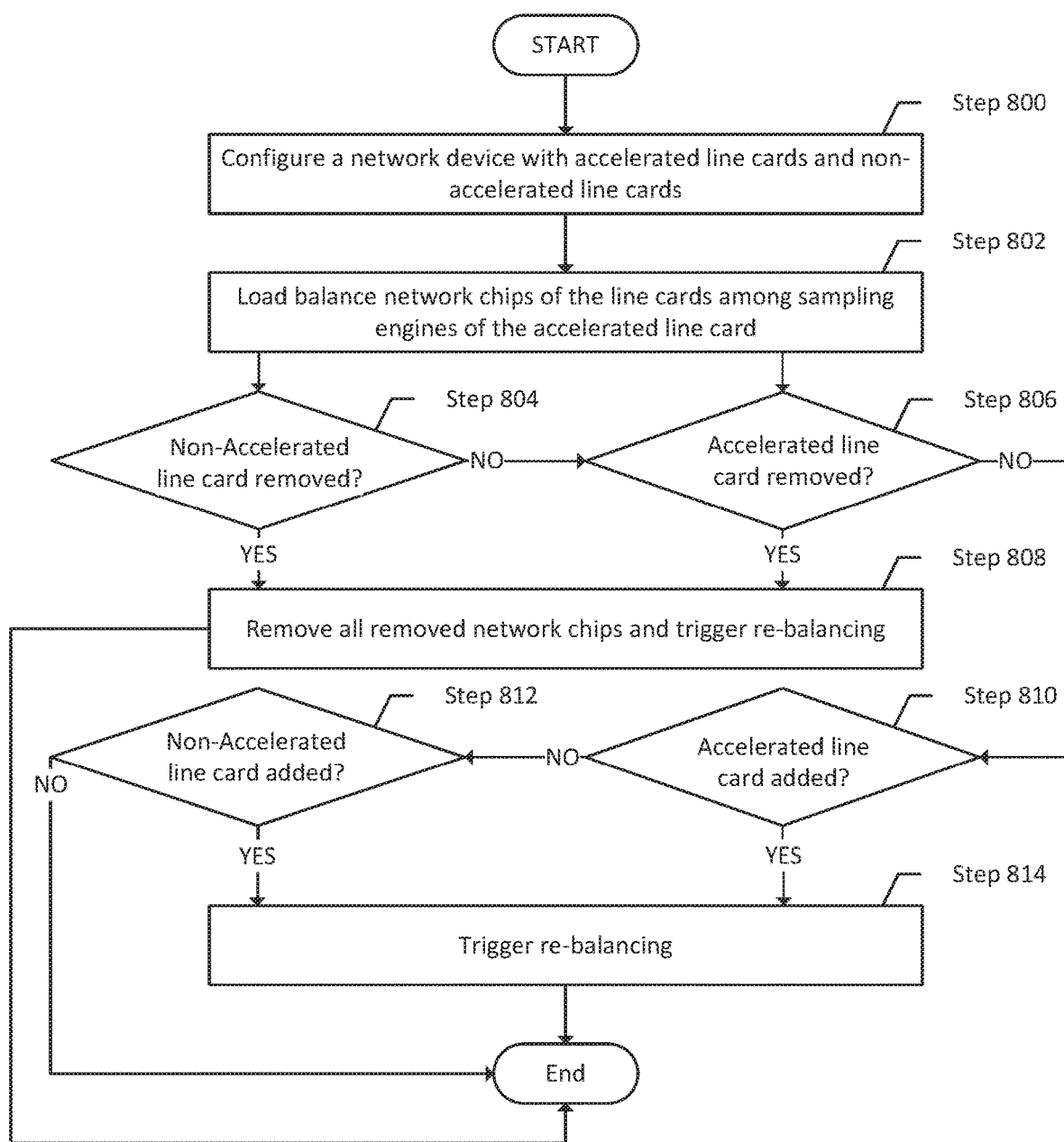
FIG. 8 shows a flowchart in accordance with one or more embodiments of the invention.

FIG. 8 shows a flowchart describing a method for accelerating network traffic sampling in accordance with one or more embodiments of the invention.

In Step 800, a network device is configured with both accelerated line cards a non-accelerated line cards. In one or more embodiments of the invention, configuring a network device with a line card includes installing a line card into the network device in an appropriate line card receiving space. Any number of accelerated line cards and non-accelerated line cards may be inserted into a network device without departing from the scope of the invention.

In Step 802, the network chips of the accelerated and non-accelerated line cards are load balanced among the sampling engines of the accelerated line cards. For example, three accelerated line cards, each with one sampling engine and two network chips, and three non-accelerated line cards, each with two network chips, may be inserted into a network device. In such an example, there are twelve total network chips and three total sampling engines included in the network device. One non-limiting example of a way to load balance the network chips among the sampling engines in such a scenario may include associating each network chip on an accelerated line card with the sampling engine of the same accelerated line card, leaving six network chips on non-accelerated line cards to be load balanced. Two network chips of the non-accelerated line cards may be associated with one of the three sampling engines of the accelerated line cards, making each of the three sampling engines associated with four network chips installed in the network device.

In one or more embodiments of the invention, during load balancing, whether an interface of a network device is included in a port-channel may be accounted for. For example, if a source interface is a member of a port-channel, then flow datagrams may set the ingress interface to identify the port-channel rather than individual member interfaces. In such an example, if member interfaces are spread across different network device chips; the network device chips may ordinarily send sampled network traffic data units to different sampling engines in the system, which may result, for example, in sFlow sequence number and sample pool calculation being incorrect. For example, a sequence number for ingress interface should be increasing monotonically. Accordingly, in one or more embodiments of the invention, the network device include functionality to send all sampled network traffic data units for all members interfaces of a particular port-channel to the same sampling engine instead of causing those interfaces to comply with an implemented load balancing scheme. Said another way, all interfaces on a network device chip which has a member interface of a port-channel may not necessarily send all sampled network traffic data units to the same sampling engine. Thus, in one or more embodiments of the invention, port-channel load-balancing is calculated independently.

In Step 804, a determination is made about whether a non-accelerated line card has been removed from the network device. In one or more embodiments of the invention, if no non-accelerated line card has been removed from the network device, the process proceeds to Step 806. In one or more embodiments of the invention, if a non-accelerated line card has been removed from the network device, the process proceeds to Step 808.

Turning to Step 806, a determination is made about whether an accelerated line card has been removed from a network device. In one or more embodiments of the invention, if no accelerated line card has been removed from the network device, the process proceeds to Step 810. If, on the other hand, an accelerated line card has been removed from the network device, the process proceeds to Step 808.

In Step 808, all network chips of the line card determined to have been removed in Step 804 or Step 808 are removed from a list of network chips installed in the network device (e.g., a list maintained in a system database), and the remaining network chips are rebalanced among the remaining sampling engines installed in the network device. If the removed line card was a non-accelerated line card, all network chips of the removed non-accelerated line card are removed from a list of installed network chips, and a re-balancing of remaining network chips among the installed sampling engines is triggered. For example, in the scenario where there are twelve network chips (two on each of three accelerated line cards and two on each of three non-accelerated line cards) distributed evenly among three sampling engines, removing one non-accelerated line card and the two network chips of the non-accelerated line card from the network device leaves ten network chips in the network device, four of which are in non-accelerated line cards. In such an example, based on a load balancing policy, the four network chips of the two remaining non-accelerated line cards may be distributed such that two of the sampling engines are associated with three of the ten remaining network chips, with one sampling engine being associated with the other four remaining network chips. Similarly, if an accelerated line card is removed, then the quantity of remaining network chips may be redistributed among the remaining sampling engines based on a load balancing policy. After the rebalancing occurs, the process ends.

Turning to Step 810, a determination is made about whether an accelerated line card has been added to a network device. In one or more embodiments of the invention, if an accelerated line card has been added to a network device, the process proceeds to Step 814. If, on the other hand, no accelerated line card is added to the network device, the process proceeds to Step 812.

In Step 812, a determination is made about whether a non-accelerated line card has been added to a network device. If no non-accelerated line card is added to the network device, the process ends. If, on the other hand, a non-accelerated line card is added to the network device, the process proceeds to Step 814.

In Step 814, a re-balancing is triggered that distributes the network chips of the network device, including the network chips determined to be added in either Step 810 or Step 812, among the sampling engines of the network device according to a load balancing policy. In one or more embodiments of the invention, if an accelerated line card was determined to have been added to the network device, the re-balancing redistributes the network chips accounting for the addition of more sampling engines. In one or more embodiments of the invention, if a non-accelerated line card is determined to have been added, then the re-balancing distributes the existing and added network chips among the already installed sampling engines of the network device.

Figure 9A:
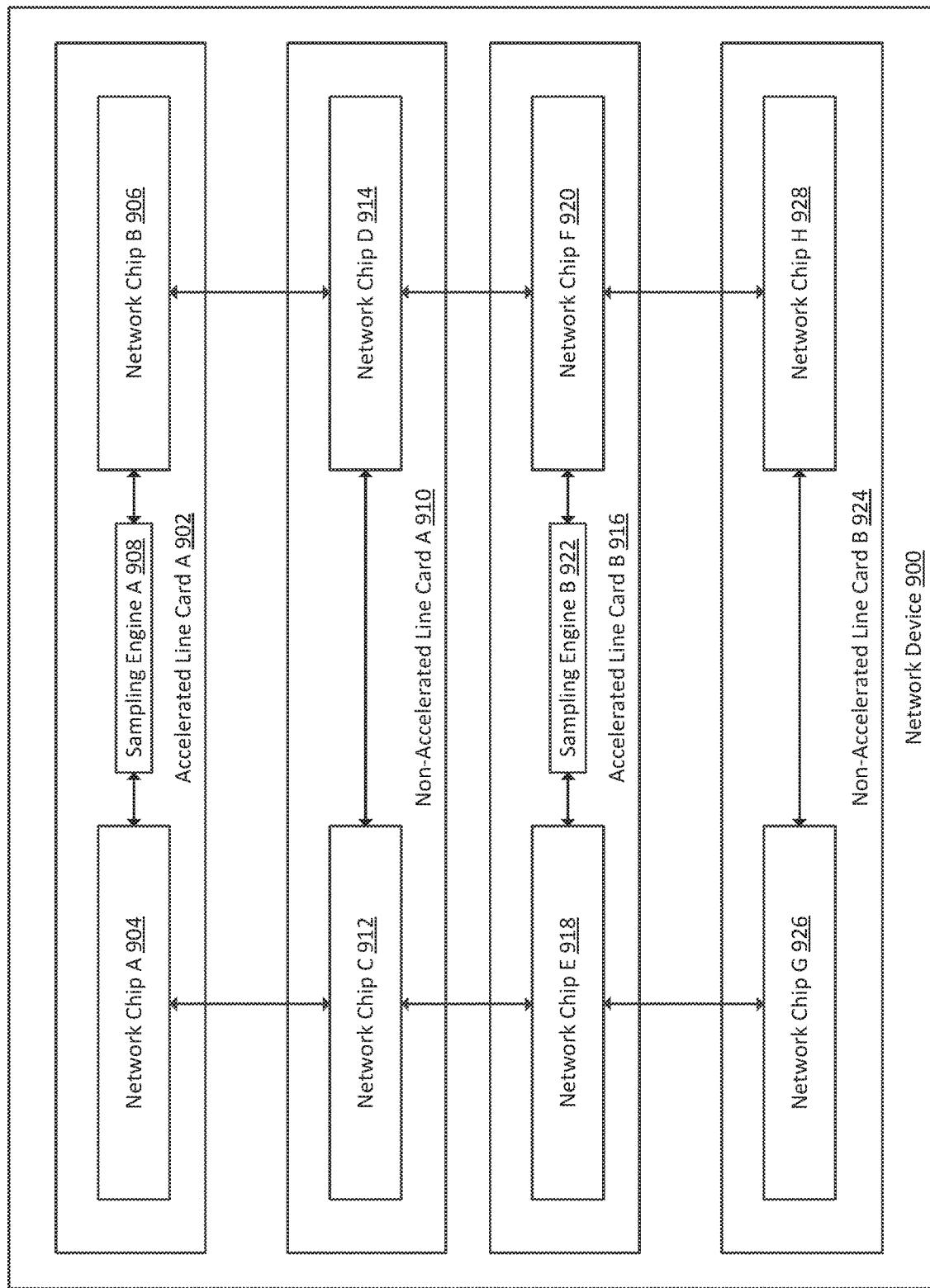
FIG. 9A shows an example in accordance with one or more embodiments of the invention.
Figure 9B:
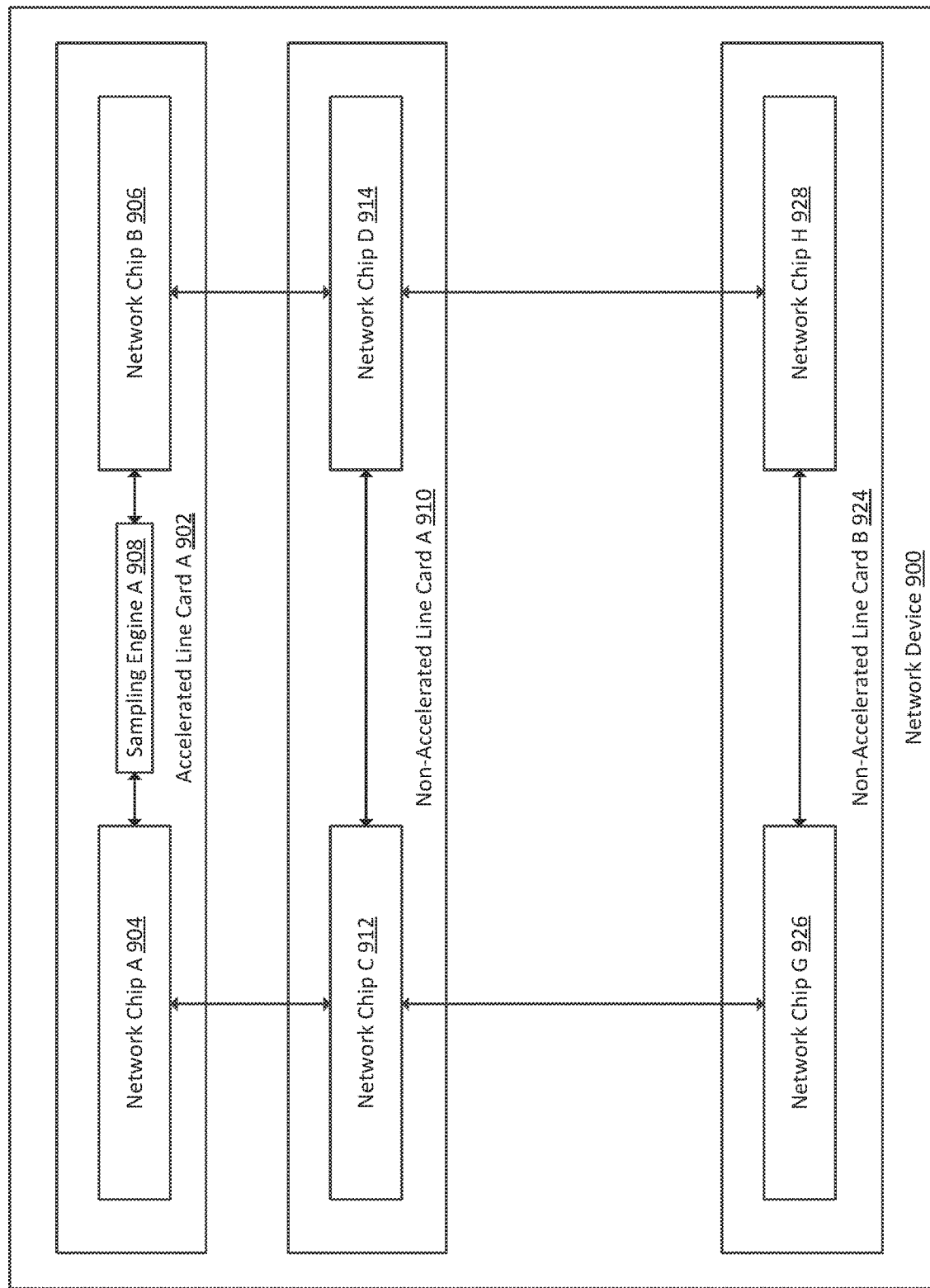
FIG. 9B shows an example in accordance with one or more embodiments of the invention.
Figure 9C:
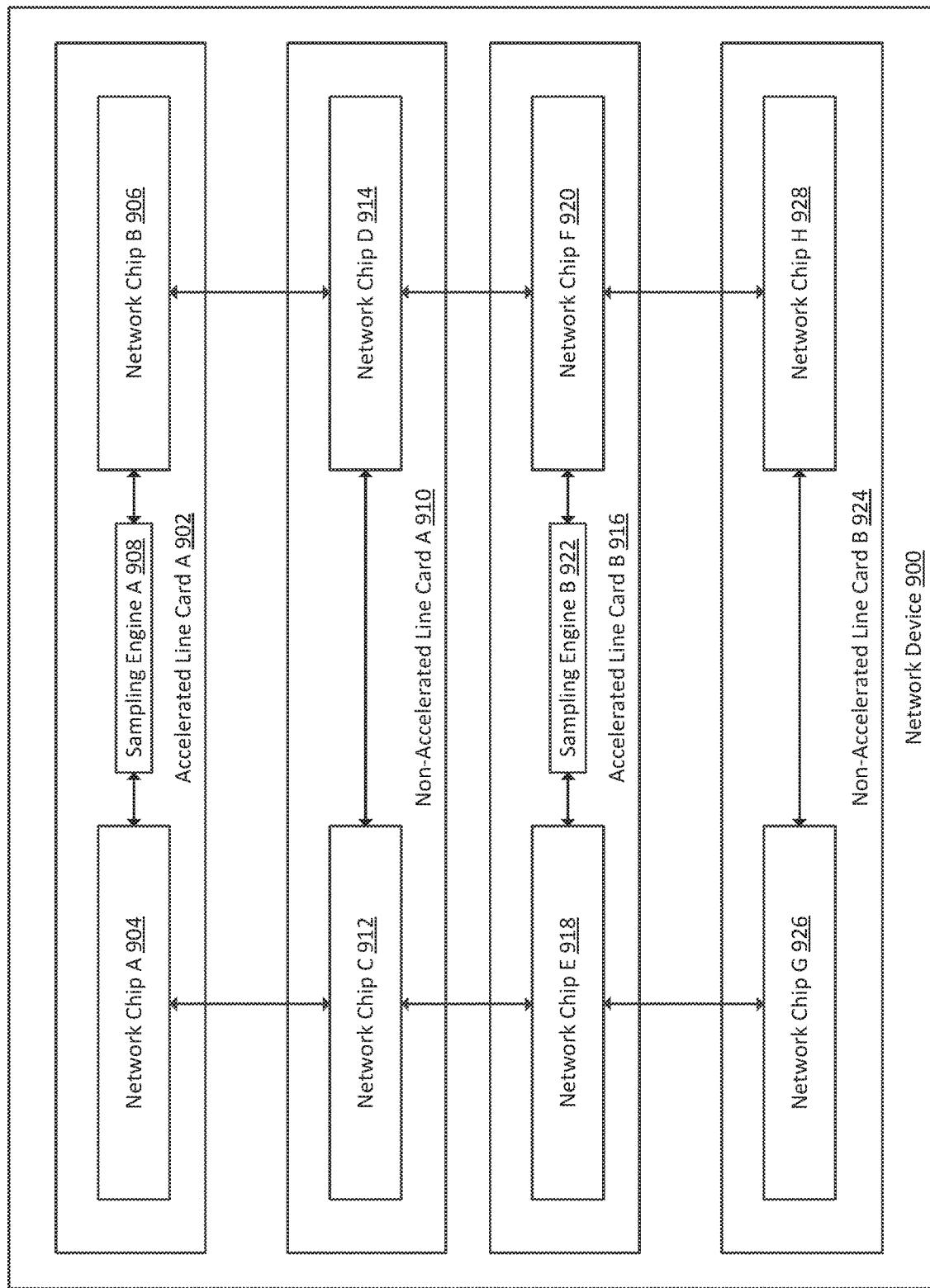
FIG. 9C shows an example in accordance with one or more embodiments of the invention.
Figure 9D:
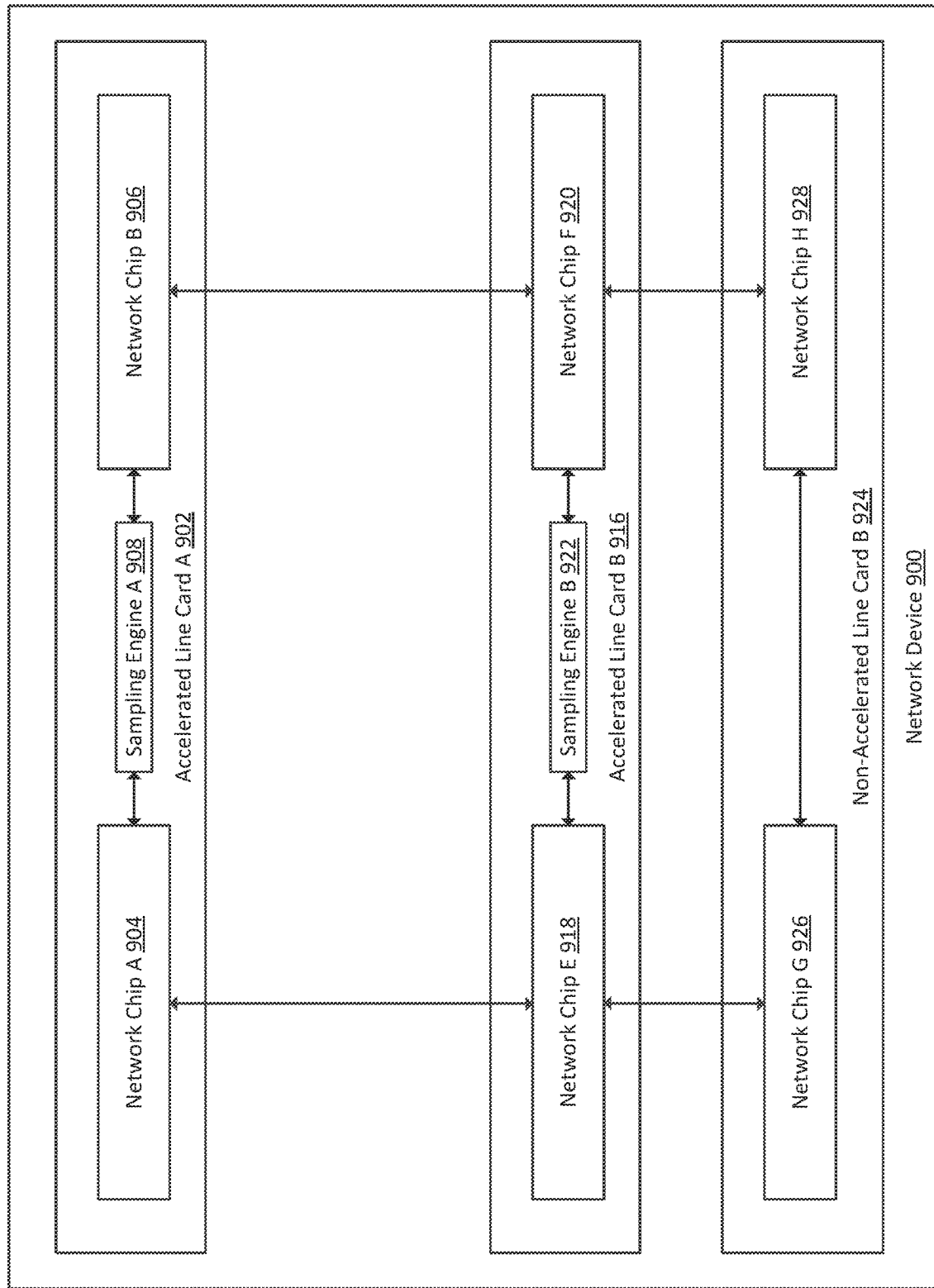
FIG. 9D shows an example in accordance with one or more embodiments of the invention.

FIG. 9A, FIG. 9B, FIG. 9B, and FIG. 9D show an example in accordance with one or more embodiments of the invention. The following example is for explanatory purposes only and not intended to limit the scope of the invention.

Referring to FIG. 9A, consider a scenario in which a network device (900) includes two accelerated line cards (902, 916) and two non-accelerated line cards (910, 924). Accelerated line card A (902) includes network chip A (904), network chip B (906), and sampling engine A (908). Accelerated line card B (916) includes network chip E (918), network chip F (920), and sampling engine B (922). Non-accelerated line card A (910) includes network chip C (912), and network chip D (914). Non-accelerated line card B (924) includes network chip G (926), and network chip H (928). Each network chip is configured with a sampling rate of one of every 1000 network traffic data units received by the network chip to be mirrored and the copy sent to a sampling engine.

In such a scenario, when network chip A (904) receives a network traffic data unit, and the sampling rate dictates that the network traffic data unit is to be sampled, then network chip A mirrors the network traffic data unit and prepends a sampling header to the copy of the network traffic data unit. The sampled network traffic data unit is then sent to sampling engine A (908). Sampling engine A (908) then processes the sampled network traffic data unit to obtain the sampling information and the network traffic data unit. Sampling engine A (908) then truncates the network traffic data unit, prepends a flow sample header, and stores the result as a flow sample. Once a certain number of flow samples have been stored (e.g., based on an MTU size for a path to a collector), sampling engine A obtains the stored flow samples, aggregates them, and prepends a flow datagram header to obtain a flow datagram. The flow datagram is then transmitted to network chip A (904), where it is processed to determine the one or more collectors to which the flow datagram is to be transmitted. Based on the aforementioned determination, a quantity of flow datagrams is generated to match the number of collectors, where the generates flow datagrams include appropriate MAC and IP header information to facilitate transmission of the flow datagrams towards the various collectors.

Additionally, in the aforementioned scenario, a load balancing policy has caused network chip A (904), network chip B (906), network chip C (912), and network chip D (914) to be associated with sampling engine A (908), while network chip E (918), network chip F (920), network chip G (926), and network chip H (9287) are associated with sampling engine B (922). Thus, each of the two sampling engines is associated with four network chips, for a balanced distribution of network chips among the sampling engines.

When a network traffic data unit is received by network chip G (926) and, according to a sampling rate configured for network chip G, is to be sampled, then network chip G mirrors the network traffic data unit and prepends a sampling header to the network traffic data unit to obtain a sampled network traffic data unit. The sampled network traffic data unit is then transmitted, via a VOQ of network chip G (926), to network chip E (918) of accelerated line card B (916) based on the association between network chip G (926) and sampling engine B (922). Network chip E, in turn, propagates the sampled network traffic data unit to sampling engine B, which processes the sampled network traffic data unit, creates a flow sample, and stores the flow sample with other flow samples. Next, the stored flow samples are aggregated into a flow datagram, a flow datagram header is prepended, and the flow datagram is sent to either network chip E (918) or network chip F (920) for further processing (e.g., prepending additional headers) and propagated towards one or more collectors.

Continuing the example with FIG. 9B, in FIG. 9B accelerated line card B is removed from the network device (900), triggering a rebalancing of the remaining network chips among the remaining sampling engines. In this scenario, because the network device had only two installed sampling engines, the six remaining network chips (904, 906, 612, 914, 926, and 928) are each assigned to sampling engine A (908).

In FIG. 9C, accelerated line card B (916) is added back to the network device. This addition again triggers a re-balancing in which four network chips are gain associated with each of the two sampling engines.

In FIG. 9D, non-accelerated line card A (910) is removed from the network device. This again causes a re-balancing of the network chips. In the scenario shown in FIG. 9D, there are now two sampling engines, and six network chips. Thus, according to a load balancing policy that strives for equitable distribution of network chips among sampling engines, three network chips (904, 906, and 926) are assigned to sampling engine A, while the other three remaining network chips (918, 920, and 928) are associated with sampling engine B (922).

One or more embodiments of the invention may facilitate acceleration of network traffic sampling (i.e., flow sampling) by offloading at least a portion of sampling activities from one or more processors of a network device to one or more sampling engines, which may improve performance of the network device.

While the invention has been described with respect to a limited number of embodiments, those skilled in the art, having benefit of this disclosure, will appreciate that other embodiments can be devised which do not depart from the scope of the invention as disclosed herein. Accordingly, the scope of the invention should be limited only by the attached claims.

What is claimed is:

1. A method of accelerating monitoring of network traffic, the method comprising:
   receiving, at a network chip of an accelerated line card of a network device, a network traffic data unit, wherein the network chip comprises first circuitry;
   capturing, by the network chip, the network traffic data unit based on a traffic sampling rate;
   adding, by the network chip, a sampling header to the network traffic data unit to obtain a sampled network traffic data unit;
   sending the sampled network traffic data unit from the network chip to a hardware sampling engine on the accelerated line card, wherein the hardware sampling engine comprises second circuitry and is configured to:
      truncate the sampled network traffic data unit to obtain a network traffic data unit portion, and
      construct a flow datagram comprising the network traffic data unit portion and a flow datagram header;
   receiving, at the network chip, from the hardware sampling engine, the flow datagram comprising the network traffic data unit portion and the flow datagram header;
   generating, by the network chip, a flow network data traffic unit comprising the flow datagram and a destination address of a collector; and
   transmitting, by the network chip, the flow network data traffic unit towards the collector.

2. The method of claim 1, further comprising, before receiving the network traffic data unit, configuring the traffic sampling rate for the network chip.

3. The method of claim 1, wherein the sampling header specifies one selected from a group consisting of:
   an ingress interface associated with the network traffic data unit,
   an egress interface associated with the network traffic data unit,
   an ingress virtual local area network (VLAN) associated with the network traffic data unit,
   an egress VLAN associated with the network traffic data unit,
   a next-hop associated with the network traffic data unit, and
   a reverse path based on a source lookup associated with the network traffic data unit.

4. The method of claim 3, wherein the egress interface may be set to identify one selected from a group consisting of a regular network traffic data unit, a multicast network traffic data unit, a network traffic data unit being sent to a processor of the network device, and a dropped network traffic data unit.

5. The method of claim 1, wherein the flow datagram comprises:
   the flow datagram header comprising information associated with the collector; and
   a flow sample comprising the network traffic data unit portion.

6. A non-transitory computer readable medium comprising instructions that, when executed by a processor, configure a network device to perform a method of accelerating monitoring of network traffic, the method comprising:
   receiving, at a network chip of an accelerated line card of the network device, a network traffic data unit, wherein the network chip comprises first circuitry;
   capturing, by the network chip, the network traffic data unit based on a traffic sampling rate;
   adding, by the network chip, a sampling header to the network traffic data unit to obtain a sampled network traffic data unit;
   sending the sampled network traffic data unit from the network chip to a sampling engine on the accelerated line card, wherein the sampling engine comprises second circuitry and is configured to:
      truncate the sampled network traffic data unit to obtain a network traffic data unit portion, and
      construct a flow datagram comprising a network traffic data unit portion and a flow datagram header;
   receiving, at the network chip, from the sampling engine, the flow datagram comprising the network traffic data unit portion and the flow datagram header;
   generating, by the network chip, a flow network data traffic unit comprising the flow datagram and a destination address of a collector; and
   transmitting, by the network chip, the flow network data traffic unit towards the collector.

7. The non-transitory computer readable medium of claim 6, wherein the method implemented by the instructions further comprises, before receiving the network traffic data unit, configuring the traffic sampling rate for the network chip.

8. The non-transitory computer readable medium of claim 6, wherein the sampling header specifies at least an ingress interface associated with the network traffic data unit and an egress interface associated with the network traffic data unit.

9. The non-transitory computer readable medium of claim 6, wherein the flow datagram comprises:
the flow datagram header comprising information associated with the collector; and
a flow sample comprising the network traffic data unit portion.

10. A method of accelerating monitoring of network traffic, the method comprising:
receiving, at a hardware sampling engine of an accelerated line card and from a network chip of the accelerated line card, a sampled network traffic data unit generated by the network chip and comprising a sampling header and a network traffic data unit, wherein the hardware sampling engine comprises first circuitry and the network chip comprises second circuitry;
processing, by the hardware sampling engine, the sampled network traffic data unit to obtain sample information;
truncating, by the hardware sampling engine, the network traffic data unit to obtain a network traffic data unit portion;
generating, by the hardware sampling engine, a flow sample header comprising the sample information;
storing, by the hardware sampling engine, in storage of the hardware sampling engine, a flow sample comprising the flow sample header and the network traffic data unit portion;
constructing, by the hardware sampling engine, a flow datagram comprising the flow sample and a plurality of other flow samples;
sending, by the hardware sampling engine, the flow datagram to the network chip, wherein the network chip:
generates a flow network traffic data unit comprising the flow datagram and a destination address of a collector, and
transmits the flow network traffic data unit towards the collector; and
clearing, by the hardware sampling engine, the flow sample and the plurality of other flow samples from the storage of the hardware sampling engine.

11. The method of claim 10, wherein constructing the flow datagram comprises:
obtaining, by the hardware sampling engine, the flow sample and the plurality of other flow samples from the storage of the hardware sampling engine,
wherein the flow datagram further comprises a flow datagram header, and the flow datagram header comprises collector information associated with a collector.

12. The method of claim 11, wherein a quantity of flow samples to be included in the flow datagram is determined by the hardware sampling engine based on a maximum transmission unit (MTU) associated with a path to the collector.

13. The method of claim 10, further comprising, before truncating the network traffic data unit, further processing the network traffic data unit to obtain a size of the network traffic data unit, wherein the flow sample header further comprises the size of the network traffic data unit.

14. A non-transitory computer readable medium comprising instructions that, when executed by a processor, configure a network device to perform a method of accelerating monitoring of network traffic, the method comprising:
receiving, at a hardware sampling engine of an accelerated line card and from a network chip of the accelerated line card, a sampled network traffic data unit generated by the network chip and comprising a sampling header and a network traffic data unit, wherein the hardware sampling engine comprises first circuitry and the network chip comprises second circuitry;
processing, by the hardware sampling engine, the sampled network traffic data unit to obtain sample information;
truncating, by the hardware sampling engine, the network traffic data unit to obtain a network traffic data unit portion;
generating, by the hardware sampling engine, a flow sample header comprising the sample information;
storing, by the hardware sampling engine, in storage of the hardware sampling engine, a flow sample comprising the flow sample header and the network traffic data unit portion;
constructing, by the hardware sampling engine, a flow datagram comprising the flow sample and a plurality of other flow samples;
sending, by the hardware sampling engine, the flow datagram to the network chip, wherein the network chip:
generates a flow network traffic data unit comprising the flow datagram and a destination address of a collector, and
transmits the flow network traffic data unit towards the collector; and
clearing, by the hardware sampling engine, the flow sample and the plurality of other flow samples from the storage of the hardware sampling engine.

15. The non-transitory computer readable medium of claim 14, wherein constructing the flow datagram comprises:
obtaining the flow sample and the plurality of other flow samples from the storage of the hardware sampling engine,
wherein the flow datagram further comprises a flow datagram header, and the flow datagram header comprises collector information associated with a collector.

16. The non-transitory computer readable medium of claim 15, wherein a quantity of flow samples to be included in the flow datagram is determined by the hardware sampling engine based on a maximum transmission unit (MTU) associated with a path to the collector.

17. The non-transitory computer readable medium of claim 14, wherein the method implemented by the instructions further comprises, before truncating the network traffic data unit, further processing the network traffic data unit to obtain a size of the network traffic data unit, wherein the flow sample header further comprises the size of the network traffic data unit.

18. A system for accelerating monitoring of network traffic, the system comprising:
a network chip comprising first circuitry, on an accelerated line card, and configured to:
receive a network traffic data unit;
select the network traffic data unit based on a traffic sampling rate;
add a sampling header to the network traffic data unit to obtain a sampled network traffic data unit;
send the sampled network traffic data unit from the network chip to a sampling engine;
receive, from the sampling engine, a flow datagram comprising a network traffic data unit portion;
generate a flow network data traffic unit comprising the flow datagram and a destination address of a collector; and
send the flow network data traffic unit to the collector; and the sampling engine comprising second circuitry, on the accelerated line card, operatively connected to the network chip, comprising storage, and configured to:
- receive, at the sampling engine and from the network chip, the sampled network traffic data unit comprising the sampling header and the network traffic data unit;
- process the sampled network traffic data unit to obtain sample information and the network traffic data unit;
- truncate the network traffic data unit to obtain a network traffic data unit portion;
- generate a flow sample header comprising the sample information;
- store, in the storage of the sampling engine, a flow sample comprising the flow sample header and the network traffic data unit portion;
- construct the flow datagram comprising the flow sample and a plurality of other flow samples;
- send the flow datagram to the network chip; and
- clear the flow sample and the plurality of other flow samples from the storage of the sampling engine.

19. The system of claim 18, wherein the sampling engine is a field programmable gate array (FPGA).

20. The system of claim 18, wherein the sampling engine is operatively connected to the network chip via a dedicated interface of the network chip.

* * * * *